(12) United States Patent
Gupta et al.

(10) Patent No.: US 7,571,156 B1
(45) Date of Patent: *Aug. 4, 2009

(54) NETWORK DEVICE, STORAGE MEDIUM AND METHODS FOR INCREMENTALLY UPDATING A FORWARDING DATABASE

(75) Inventors: Pankaj Gupta, Palo Alto, CA (US); Srinivasan Venkatachary, Sunnyvale, CA (US)

(73) Assignee: NetLogic Microsystems, Inc., Mountain View, CA (US)

( * ) Notice: Subject to any disclaimer, the term of this patent is extended or adjusted under 35 U.S.C. 154(b) by 454 days.

This patent is subject to a terminal disclaimer.

(21) Appl. No.: 10/809,244

(22) Filed: Mar. 25, 2004

Related U.S. Application Data

(60) Provisional application No. 60/458,497, filed on Mar. 28, 2003.

(51) Int. Cl.
G06F 7/00 (2006.01)
G06F 17/30 (2006.01)
(52) U.S. Cl. .......................... 707/3; 707/101; 707/102
(58) Field of Classification Search ................. 707/3, 707/101, 102
See application file for complete search history.

(56) References Cited

U.S. PATENT DOCUMENTS

| | | | |
|---|---|---|---|
| 5,574,910 A * | 11/1996 | Bialkowski et al. ............. 707/1 |
| 6,018,524 A * | 1/2000 | Turner et al. ................. 370/392 |
| 6,154,384 A | 11/2000 | Nataraj et al. |
| 6,192,051 B1 | 2/2001 | Lipman et al. |
| 6,215,816 B1 | 4/2001 | Gillespie et al. |
| 6,223,172 B1 | 4/2001 | Hunter et al. |
| 6,307,855 B1 | 10/2001 | Hariguchi |
| 6,374,326 B1 | 4/2002 | Kansal et al. |
| 6,385,649 B1 | 5/2002 | Draves et al. |
| 6,546,391 B1 | 4/2003 | Tsuruoka |
| 6,571,313 B1 * | 5/2003 | Filippi et al. ................. 711/108 |
| 6,735,600 B1 * | 5/2004 | Andreev et al. ........... 707/104.1 |
| 6,963,924 B1 | 11/2005 | Huang et al. |
| 7,162,481 B2 * | 1/2007 | Richardson et al. ......... 707/101 |
| 7,249,228 B1 | 7/2007 | Agarwal et al. |
| 7,266,085 B2 | 9/2007 | Stine |
| 7,299,399 B2 | 11/2007 | Huang |
| 7,313,666 B1 | 12/2007 | Saminda De Silva et al. |
| 7,426,518 B2 * | 9/2008 | Venkatachary et al. ...... 707/101 |
| 2002/0089937 A1 | 7/2002 | Venkatachary et al. |

OTHER PUBLICATIONS

Lampson et al., "IP Lookup using Multiway and Mulcicolumn Search," Aug. 1997, pp. 1-23.

(Continued)

*Primary Examiner*—John R. Cottingham
*Assistant Examiner*—Kimberly Lovel
(74) *Attorney, Agent, or Firm*—Shemwell Mahamedi LLP; William L. Paradice, III

(57) ABSTRACT

Network devices, storage mediums and methods for updating a memory structure in a data plane of the network device when route updates are received in the control plane of the network device. The methods described herein can be used to perform one of the following algorithms: a Basic Incremental Split-Merge (BISM) algorithm, a Lazy Incremental Split-Merge (LISM) algorithm, and a Down-support Split-Merge (DSM) algorithm. Each of the algorithms described herein may be used to incrementally update portions of a forwarding database stored within the memory structure, where the updated portions correspond to only those portions affected by the route updates.

13 Claims, 12 Drawing Sheets

OTHER PUBLICATIONS

Gupta, "Algorithms for Routing Lookups and Packet Classification," Dec. 2000, pp. 1-197.

Chen et al., "A Fast and Scalable IP Lookup Scheme for High-Speed Networks," © 1999 IEEE, pp. 211-218.

Pao et al., "Efficient Hardware Architecture for Fast IP Address Lookup," IEEE INFOCOM 2002, pp. 555-561.

Akhbarizadeh et al., "Reconfigurable Memory Architecture for Scalable IP Forwarding Engines," © 2002 IEEE, pp. 432-437.

Yu et al., "Forwarding Engine for Fast Routing Lookups and Updates," 1999 Global Telecommunications Conference, pp. 1556-1564.

International Search Report, PCT/US2004/009531, mailed Sep. 2, 2004.

A Fast and Scalable IP Lookup Scheme for High-Speed Networks, Chen et al., ©1999 IEEE, pp. 211-218.

Efficient hardware Architecture for Fast IP Address Lokup, Pao et al., IEEE INFOCOM 2002, pp. 555-581.

Fast and Scalable Layer 4 Switching, V. Srinivasan, G Varghese, S. Suri and M. Waldvogel, Presented at ACM Sigcomm '98, 16 page slide presentation.

Forwarding Engine for Fast Routing Lookups and Updates, Yu et al., 1999 Gobal Telecommunications Conference, pp. 1556-1564.

Packet Classification using hierarchical Intelligent Cuttings, Pankaj Gupta and Nick McKeown, Proc. Hot Interconnects VII, Aug. 1999, Stanford University.

Packet Classification on Multiple Fields, Pankj Gupta and Nick McKeown, Proc. Sigcomm, Computer Communication Review, vol. 29, No. 4, pp. 147-160, Sep. 1999 Harvard University.

Reconfigurable memory Architecture for Scalable IP Forwarding Engines, Akhbarizadeh et al., © 2002 IEEE, pp. 432-437.

Fast Address lookups using controlled Prefix Expansion, Venkatachary Srinivasan et al., ACM Transactions on Computer Systems, vol. 17, No. 1, Feb. 1999, pp. 1-40.

* cited by examiner

BASIC INCREMENTAL SPLIT MERGE (BISM) ALGORITHM
T=50; N=300; Ns=9

LAZY INCREMENTAL SPLIT MERGE (LISM) ALGORITHM
T=50; N=300; Tm=5; (2N/T)+1=13; Ns=8

NETWORK DEVICE, STORAGE MEDIUM AND METHODS FOR INCREMENTALLY UPDATING A FORWARDING DATABASE

This application claims benefit of priority to Provisional Patent Application Ser. No. 60/458,497 filed Mar. 28, 2003, and incorporates Ser. No. 60/458,497 in its entirety, including the software code listing set forth therein. Moreover, this application relates to co-pending U.S. patent application Ser. No. 10/402,887 filed on Mar. 28, 2003, by the same inventors Pankaj Gupta and Srinvasan Venkatachary, titled "SYSTEM AND METHOD FOR EFFICIENTLY SEARCHING A FORWARDING DATABASE THAT IS SPLIT INTO A BOUNDED NUMBER OF SUB-DATABASES HAVING A BOUNDED SIZE," which is hereby incorporated in its entirety.

TECHNICAL FIELD

This invention relates to computer networking. More particularly, the invention relates to network devices, carrier mediums and methods for updating a forwarding database of a lookup table that is bifurcated into a pre-determined number of sub-databases of pre-determined size, each of which can be selected using a pointer table that chooses the sub-database of interest having the longest matching prefix.

BACKGROUND OF THE INVENTION

Computer networking is generally recognized as the communication of packets across an interconnected network of computers. One objective of networking is to quickly forward the packets from a source to a destination. Thus, one or more forwarding devices may be placed within the network for performing such a function. As used herein, the term "forwarding devices" can be used interchangeably to refer to gateways, bridges, switches, or routers.

A forwarding device typically includes a lookup table containing a representation of at least a portion of the network topology, as well as current information about the best known paths (or "routes") from the forwarding device to one or more destination addresses. For example, a forwarding device may store address prefixes (or "prefix entries") and next hop identifiers in a lookup table. The prefix entries generally represent a group of destination addresses that are accessible through the forwarding device, whereas next hop identifiers represent the next device along the path to a particular destination address. Other information may be stored within the lookup table, such as the outgoing port number, paths associated with a given route, time out values and one or more statistics about each route.

When an incoming address is received by a forwarding device, the address is compared to the prefix entries stored within the lookup table. If a match occurs, the packet of information associated with the address is sent to an appropriate output port of the forwarding device. As links within the network change, routing protocols sent between forwarding devices may change the prefix entries within the corresponding lookup tables. This change will modify not only the prefix entries within the lookup table, but also the next-hop identifiers pointed to by those prefix entries. Thus, routing through the forwarding devices can be dynamically changed (i.e., updated) as links go down and come back up in various parts of the network.

The Internet Protocol (IP) is the protocol standard most widely used for packet communication to and from the Internet. Internet Protocol (IP) addresses associated with a packet generally comprise a network field (for identifying a particular network) and a host field (for identifying a particular host on that network). All hosts on the same network have the same network field but different host fields. In "class-based" addressing architectures, the IP address space is partitioned into a number of different classes (e.g., classes A-E), each distinguished by the number of bits used to represent the network field. For example, a class 'A' network may be represented by a 7-bit network field and a 24-bit host field, whereas a class 'C' network may be represented by a 21-bit network field and an 8-bit host field. The number of bits dedicated to the network and host fields may vary from class to class in the class-based addressing architecture. As network traffic increased, however, class-based architectures began to suffer from various problems; namely, the impending depletion of IP address space and the exponential growth of lookup tables.

In an attempt to slow the growth of lookup tables and allow more efficient use of the IP address space, an alternative addressing and routing scheme referred to as Classless Inter-Domain Routing (CIDR) was adopted in 1993. The "classless" addressing architecture improved upon the class-based architecture by varying the boundary between the network field and the host field. In other words, the use of classless addressing architectures enabled network fields to be made of arbitrary length, rather than constraining them to fixed network-host field boundaries. Though beneficial in alleviating the above problems, the change from class-based to classless addressing architectures only increased the complexity and reduced the speed of the lookup operation.

In addition to class-based and classless addressing architectures, there are currently several versions of IP addressing. For instance, IP version 4 (IPv4) uses a 32-bit addressing prefix, whereas IP version 6 (IPv6) uses a 128-bit addressing prefix. If, for example, IPv4 addressing is used, then the forwarding device might only consider the first 8, 16 or 24 bits of the 32-bit addressing field in determining the next hop. The number of bits considered by the forwarding device is typically referred to as the prefix length (p).

A popular way to determine the next hop is to use a technique known as longest-matching prefix. In this technique, a 32-bit IP address of, for example, 192.2.8.64 is compared against a prefix entry (or "prefix") within the lookup table. The prefix 192.2.0.0/16 has a longer matching prefix than prefix 192.0.0.0/8. This is due primarily to the prefix length in the former being 16 bits, and the prefix length in the latter being only 8 bits. When employing the longest matching prefix technique, the forwarding device will initially consider the first two bytes of 192.2* to determine the next hop address at which to send the packet.

There are many ways to perform a longest-matching prefix comparison. For example, pointers or hashes may be used to divide the lookup table into a plurality of sub-databases, each representing a different route through the network. To locate individual sub-databases, the first few bits of a binary prefix entry may be stored as a pointer within a pointer table. Each pointer entry keeps track of the prefixes within a particular sub-database, and points to subsequent binary entries needed to complete the longest prefix match. Unfortunately, many routes (empty routes) pointed to by the pointer entry may never be used (i.e., never compared with the incoming address). Moreover, while some routes (sparse routes) might seldom be used, other routes (dense routes) are used more often. Therefore, many sub-databases may be empty or sparse of any prefix entries matching the incoming addresses. Dividing a database of prefixes using precursor pointers, while heuristic, does not assure that the databases will be optimally divided. Moreover, the above technique does not provide any worst-case guarantees on lookup performance.

Another technique used to divide a database may involve the use of a tree (or "trie"). There are many different tree configurations. A simple tree is often referred to as a binary tree, with more complex trees being compressed forms of the binary tree. To search for an address within a tree, the search begins at a root node. Extending from the root node, a "1" pointer or a "0" pointer is followed to the next node, or the next binary bit position, within the tree. If, for example, the address begins with 001*, then the search begins at the root node and proceeds downward to each vertex node, beginning along the "0" branch pointer to the next "0" branch pointer, and finally to the "1" branch pointer. The search will continue until a leaf node is reached or a failure occurs. In some cases, the binary tree may be compressed to enhance the search operation. A Patricia tree is one form of compression used to shorten the length of a branch to having relatively few leaf nodes.

As one disadvantage, the longest-matching prefix search techniques described above do not take into account that certain sub-databases or branches may rarely be searched while others are predominantly searched. While a tree proves helpful in locating prefixes within the leaf nodes, a precondition of searching a tree is that before the next node can be fetched, the previous nodes must be retrieved. Empty or sparse routes may, therefore, result in a relatively slow search, and thus, a relatively slow lookup operation.

The speed with which a search or lookup operation is performed could be increased if the prefix entries within each node (or searchable sub-database) were more optimally apportioned. Co-pending application Ser. No. 10/402,887 describes a system and method for configuring sub-databases within the overall forwarding database of a lookup table. In general, the co-pending application describes how the forwarding database may be optimally apportioned by placing bounds on the number of prefixes within each sub-database, and bounds on the number of sub-databases within the lookup table. By controlling the number of sub-databases and the sizes of the sub-databases, lookup operations are more deterministic, and worst-case lookup times can be guaranteed. Moreover, the bounded number of sub-databases can be more optimally apportioned to a physical device, such as a memory, with dedicated portions of the memory appropriately sized to accommodate a corresponding sub-database. This may ultimately lessen the amount of power consumed by the lookup operation, since only one sub-database need be accessed during a particular lookup.

In the co-pending application, the forwarding database is constructed in a static fashion, i.e., once the whole database is known. However, the co-pending application does not describe how to construct or update the forwarding database in an incremental, online fashion when the database is being updated rapidly (which is typically the case in real-life applications). At some points in the Internet, route updates may occur at peak rates of about one-thousand updates per second (with a lower average around a few updates per second). Therefore, a need exists for a system and method for dynamically updating a forwarding database, and more specifically, a system and method capable of obtaining significantly greater update rates than those currently achieved in the worst-case scenario.

SUMMARY OF THE INVENTION

According to one embodiment, an algorithm is described herein for updating a memory structure within a data plane of a forwarding device when one or more route updates occur in a control plane of the forwarding device. In some embodiments, algorithms described herein may achieve over ten thousand updates per second, while meeting the atomicity and consistency requirements for functional operation.

According to another embodiment, a forwarding device is described herein as having a computer readable storage medium and an execution unit. The computer readable storage medium may be adapted to update a memory structure within a data plane of the forwarding device when one or more route updates occur in a control plane of the forwarding device. The execution unit may be coupled to the storage medium and operable to fetch a sequence of program instructions from the storage medium. For example, the sequence of program instructions may be stored as one or more "executable files" in the storage medium, and once fetched by the execution unit, may be loaded into local system memory for execution thereof. Upon execution, the sequence of program instructions may implement a particular algorithm, process or operation for updating the memory structure. As described in more detail below, the particular algorithm may be selected from a list of update algorithms including: a Basic Incremental Split-Merge (BISM) algorithm, a Lazy Incremental Split-Merge (LISM) algorithm, and a Down-support Split-Merge (DSM) algorithm. As used herein, the term "algorithm" may be used interchangeably with the terms "process" or "operation" to describe the update methodology embodied within the sequence of program instructions.

Generally speaking, a "forwarding device" may be arranged on a network for "routing" or "forwarding" packets of information from one point to another. In some cases, the forwarding device may be selected from a group of network devices comprising: a router, a switch, a bridge and a gateway, among others. Assume, for example, that the forwarding device is a router containing one or more line cards (for determining where the packets should be sent next) and a switching fabric (for directing the packets to the appropriate output port of the router). In such an example, the above-mentioned computer readable storage medium and memory structure may be included within one or more line cards of the forwarding device.

In order to successfully route the packets from one destination to another, the forwarding device must keep up-to-date information about the various routes throughout the network. Such routing information is generally kept in a forwarding database or "lookup table". In most cases, the forwarding database may be stored within a control plane storage medium (such as the computer readable storage medium). In some cases, however, a copy of the forwarding database may be stored within a data plane storage medium (such as the memory structure) to enable faster packet processing. As such, the forwarding database may be referred to as a "routing table," whereas the copy may be referred to as a "forwarding table."

One or more processing devices may be included within the line cards of the forwarding device. In some cases, for example, the execution unit may be a central processor arranged within the control plane of the forwarding device. As such, the central processor may be coupled to the computer readable storage medium for receiving the sequence of program instructions corresponding to the selected algorithm. Upon execution of the program instructions, the central processor may be configured for updating only the portion of the forwarding database (i.e., the "routing table") that is affected by the route updates sent to the control plane. In some cases, a local processor may also be arranged within the data plane of the forwarding device. In such cases, the local processor may be coupled to the central processor for receiving the updated portion of the forwarding database, and for using the updated portion to update the copy of the forwarding database (i.e., the "forwarding table") stored within the memory structure.

According to a further embodiment, a method is described herein for updating a forwarding database. In some cases, the method may form a hierarchical tree structure representing the forwarding database. In particular, the hierarchical tree structure may be formed by splitting N number of prefixes within the database into a number of sub-databases that are preferably bounded by N/T and 2N/T+1. The method may subsequently modify the hierarchical tree structure in accordance with one or more update operations, and may update a portion of the forwarding database to reflect the modifications made to the hierarchical tree structure. The updated portion, however, may correspond to only those sub-databases affected by the update operations.

The method may form the hierarchical tree structure in the following manner. Beginning with the most significant bit (MSB) of the N number of prefixes, the method may repeatedly split the N number of prefixes into a plurality of nodes extending between and including a root node and a number of leaf nodes. Each of the leaf nodes may correspond to one of the sub-databases. To create an efficient tree structure, each sub-database (and therefore, each leaf node) should have no more than a predetermined maximum number of prefixes (e.g., T), which is less than the total number of prefixes, N.

The method may modify the hierarchical tree structure by performing an update operation on a sub-database (or leaf node) that is affected by a route update received in the control plane. The "update operation" may be selected from a group comprising: adding a new prefix to the forwarding database, deleting an existing prefix from the forwarding database and modifying an existing prefix in the forwarding database. In some cases, the hierarchical tree structure may be modified by the method to reflect a batch of route updates by performing a plurality of update operations specified in an update list.

In some cases, the Basic Incremental Split-Merge (BISM) algorithm may be selected for updating the forwarding database. After performing the update operation on the sub-database to form an updated sub-database, no further steps may be needed to modify the hierarchical tree structure, if the current number of prefixes in the updated sub-database is less than or equal to the predetermined maximum number of prefixes. However, an additional step may be required if the updated sub-database "overflows" or exceeds the predetermined maximum number of prefixes. If this happens, a "Split-Merge" operation may be performed on the updated sub-database.

In other cases, a Lazy Incremental Split-Merge (LISM) algorithm, or alternatively, a Down-Support Split-Merge (DSM) algorithm may be selected for updating the forwarding database. After performing the update operation on the sub-database to form an updated sub-database, for example, the step of modifying may further include one or more of the following steps: (1) splitting an "overflowed" leaf node (i.e., a node having more than the maximum number of prefixes) into at least one additional pair of leaf nodes, each having less than the maximum number of prefixes, and/or (2) merging an "underflowed" leaf node (i.e., a node having fewer than a minimum number of prefixes) with an ancestor node arranged closer to the root node than the underflowed leaf node. The step of merging, however, may be contingent on one or more conditions.

If the LISM algorithm is selected, the step of merging may be performed only if: (i) the total number of nodes in the hierarchical tree structure is equal to or greater than 2N/T+1, (ii) the total number of nodes in the hierarchical tree structure falls within a predetermined range of values immediately preceding and/or encompassing the value represented by 2N/T+1, or (iii) a predetermined time period has passed in which substantially no merge operations were performed. Regardless of the condition selected for use in the LISM algorithm, the step of merging is performed by repeatedly merging the leaf node and the ancestor node up towards the root node, if the number of prefixes within the leaf node, the ancestor node and any subsequently merged ancestor nodes remains less than the minimum number of prefixes.

If the DSM algorithm is selected, the step of merging may be performed only if no other node exists below the ancestor node that can be paired with the leaf node, such that the combined number of prefixes within the leaf node and the other node is greater than the predetermined maximum number of prefixes. In the DSM algorithm, the steps of splitting and merging may be performed no more than one time each. In some cases, the step of splitting may be performed by execution of the Split-Merge operation.

According to yet another embodiment, a computer readable storage medium is described herein as including a forwarding database and an updating program. The forwarding database may include N number of prefixes split among a plurality of sub-databases. As noted above, each sub-database may initially include less than T number of prefixes, with T being less than N. In some cases, the forwarding database may be represented as a hierarchical tree structure initially including a number of branches extending from a root node to a plurality of leaf nodes. Each of the plurality of leaf nodes may correspond to one of the plurality of sub-databases in the forwarding database, and at least a portion of the sub-database at each leaf node may be contained within respective portions of the computer readable storage medium.

In some cases, the updating program may be stored within a control plane storage medium. For example, the updating program may be stored within the computer readable storage medium along with the forwarding database. The computer readable storage medium may include, for example, random access memory (DRAM or SRAM). In other cases, the updating program may be stored within a memory structure indirectly coupled to the processor. Such a memory structure may be arranged within the data plane for storing a copy of the forwarding database, and may include one or more of the following types of storage: a random access memory (DRAM or SRAM), a content-addressable memory (CAM or TCAM), or a network search engine (NSE).

In some cases, the computer readable storage medium may be directly coupled to, or incorporated within a processor. The processor may be configured for executing a sequence of program instructions related to the updating program. When executed upon the processor, the updating program may be configured to: (1) modify the hierarchical tree structure in accordance with one or more update operations, and (2) update a portion of the forwarding database to reflect the modifications made to the hierarchical tree structure. However, and as noted above, the updated portion may correspond to only those sub-databases affected by the update operations.

BRIEF DESCRIPTION OF THE DRAWINGS

Other objects and advantages of the invention will become apparent upon reading the following detailed description and upon reference to the accompanying drawings in which.

DETAILED DESCRIPTION

Figure 1:
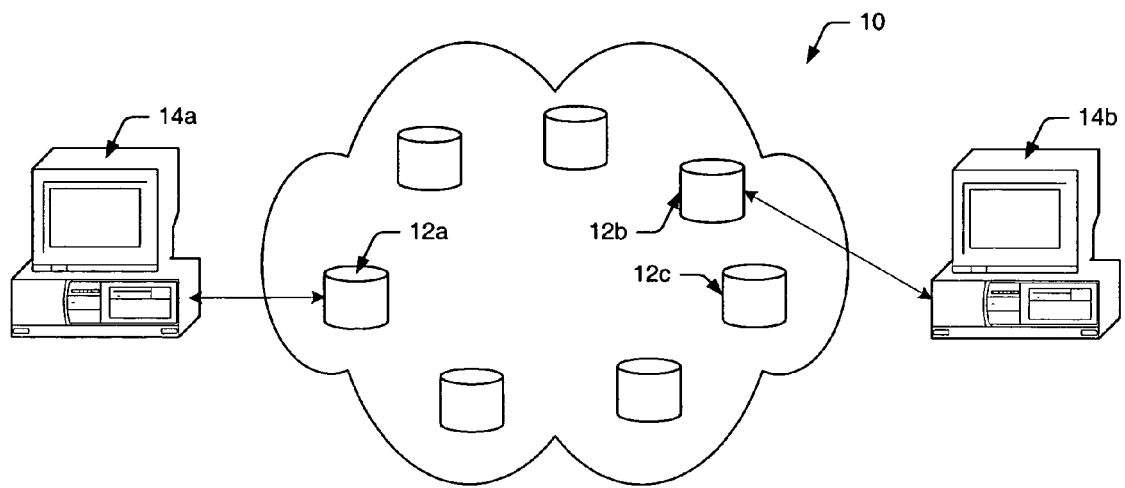
FIG. 1 is a block diagram of a communication network.

Although the term "network" is specifically used throughout this disclosure, the term network is defined to include the Internet and other network systems, including public and private networks that use the Internet Protocol (IP) protocol suite for data transport. Examples include the Internet, Intranets, extranets, telephony networks ("using voice over IP"), and other wire-line and wireless networks that converge on the use of the IP family of protocols. Although the term "Internet" may be used throughout this disclosure, the term Internet is merely one example of an IP "network."

Routing protocols, such as the Border Gateway Protocol (BGP) or the Open Shortest Path First (OSPF) protocol, compute routing tables on the basis of the network topology—e.g., the routers forming the network, the connectivity graph of the intervening links, and the distance between the routers in terms of the number of hops. As used herein, the term 'routers' will also be interpreted to include 'switches' and any other devices deemed to be "forwarding devices". Since routing tables are intended to reflect current network conditions, routing tables must be changed or updated as the network topology changes, which happens, e.g., when routers or links fail or come back up. These changes are usually incremental modifications (e.g., adds or withdrawals) to the current routing table at an affected router, and are referred to herein as "route updates".

To reflect a change in network topology, the following steps may be performed by an affected router (or another "forwarding device"). In a first step, the routing protocol (such as BGP or OSPF) recomputes the affected routes. This recomputation is performed by protocol software in the control plane of the affected router(s) and typically uses a shortest path routing algorithm. However, the recomputation may take a substantial amount of time to "converge" (i.e., to return the best route). For example, the performance of the first step may depend on the exact change in network topology and the routing protocol under deployment.

Most modern routers may use a different version of the routing table, called a "forwarding table," which is computed from the routing table by the forwarding software in the control plane, and then downloaded to hardware components in the data plane for faster processing of data packets. Therefore, any changes made to the routing table need to be reflected in the forwarding table within the router hardware. This constitutes a second step in the update process. Data packets passing through the affected router can then use the new routes in the updated forwarding tables.

The performance of the second step generally depends on the mechanism by which the forwarding table is computed and updated from the routing table, and is directly determined from the particular forwarding solution being used. A variety of forwarding solutions are currently used to store and search for routes in the forwarding table. For example, a network search engine (NSE) or ternary content addressable memory (TCAM) may be used for storing and searching through the forwarding table. As used herein, the term NSE may be interpreted to include TCAMs. In another example, off-chip memory may be used with either on-chip, custom-designed logic, or software running on a specialized packet processor implementing one or more forwarding algorithms. In yet another example, an off-the-shelf search engine may be used for running forwarding algorithms, and may include embedded memory for storing routes.

Though a particular solution was provided in the co-pending application for constructing an efficient forwarding database, a need remains for improved systems and methods for updating the forwarding database in an incremental, online fashion. Such systems and methods will be described below in reference to FIGS. 7-14.

FIG. 1 illustrates possibly numerous forwarding devices 12 within a computer network 10. The topology of the Internet or the Intranet interposed between computers 14 can vary. If computer 14a wishes to send a packet of data to computer 14b, then it must do so by traversing one or more forwarding devices 12 within network 10. Forwarding device 12a might receive the packet, which includes a destination address of, for example, forwarding device 12b (or computer 14b). Determining where to send the packet within network 10 so that the packet arrives at a forwarding device (or hop) closer to the destination, is essentially the function of the lookup tables within the forwarding device 12a. Optimally, the lookup tables within forwarding device 12a will receive the destination address, and will compare that address (or "key") to prefixes stored within the lookup tables. Associated with each prefix might be a next hop identifier. Thus, once a prefix is found that matches (using, for example, the longest prefix match comparison) with the destination address, the packet can be routed to the next hop to be one step closer to the intended destination.

Figure 2:
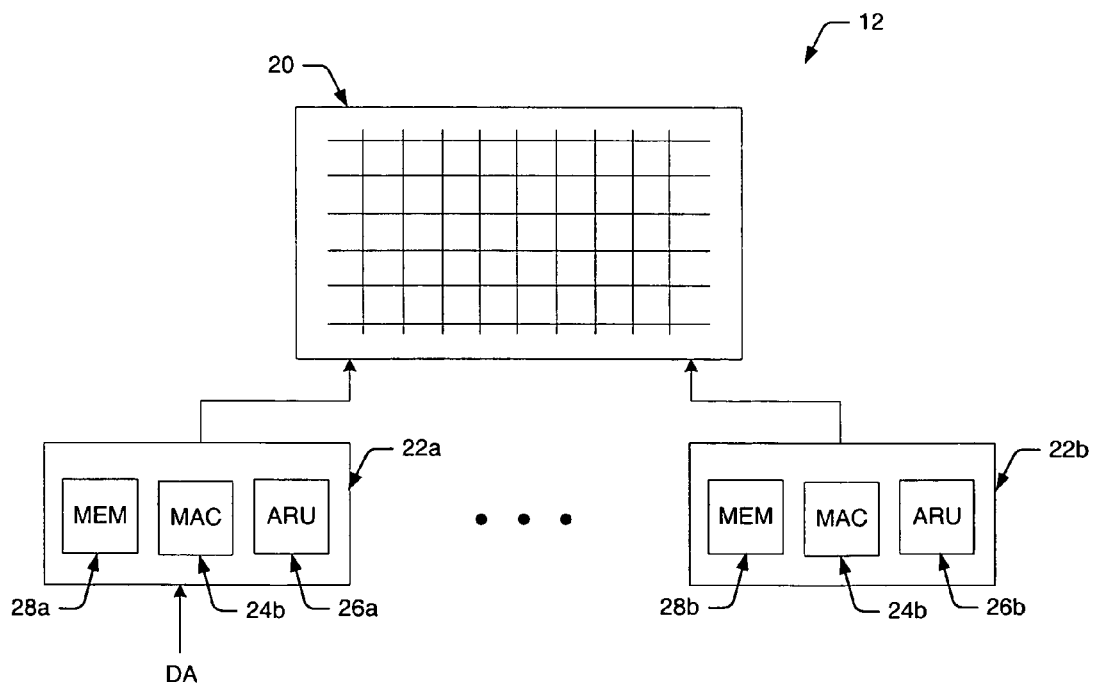
FIG. 2 is a block diagram of a packet-forwarding engine, or "forwarding device" (e.g., a switch or router), within the communication network of FIG. 1.

FIG. 2 illustrates one example of forwarding device 12, such as a router, gateway, bridge, or switch. Forwarding device 12 is often called a "packet-forwarding engine" and may contain a switching fabric 20 and a plurality of line cards 22. Switching fabric 20 is generally well known, and may involve a crossbar switch that interconnects all of the line cards with one another. At least one line card may contain a routing processor. Forwarding device 12 can, therefore, be thought of as performing two functions: (i) performing route lookup based on the destination address of the packet in order to identify an outgoing port; and (ii) switching the packet to the appropriate output port.

The routing function can be performed primarily on the incoming line card (e.g., line card 22a), whereas switching of the packet to the appropriate output port or line card can take place within switching fabric 20. The Destination Address (DA) of the packet can enter line card 22a via an I/O interface. Each line card typically includes a Media Access Controller (MAC) 24, an Address Resolution Unit (ARU) 26, and a memory device 28. MAC 24 can be configured to accept many different communication protocols, such as, e.g., the Carrier Sense Multiple Access/Collision Detect (CSMA/CD), Fiber Distributed Data Interface (FDDI), or Asynchronous Transfer Mode (ATM) communication protocols. As packets are read from ingress MAC 24a, forwarding control information necessary for steering the packet through switching fabric 20 will be prepended and/or appended to those packets.

The ARU 26 at the ingress line card preferably performs the routing function using the longest prefix match comparison technique. The ARU can perform classless or class-based routing functions and can support Variable Length Subnet Masks (VLSM). Each ARU can be reconfigured—as routes are added or deleted from the network—using well-known routing protocols, such as OSPF or BGP. The memory device 28 can be implemented in various types of Random Access Memory (RAM), such as DRAM, SRAM, or Content-Addressable Memory (CAM), a popular form of masking CAM being Ternary CAM (or TCAM). Memory 28 may contain the various lookup tables. For example, memory 28 may contain one or more of the following lookup tables: a pointer table, a routing table and a next hop table. If one or more of the lookup tables are copied and placed within the line card 22, lookups on incoming packets can be performed locally, without loading the central processor of the forwarding device 12. As used herein, a local copy of a lookup table may be referred to as a "forwarding table", and may be stored in a memory device not shown in FIG. 2.

Figure 3:
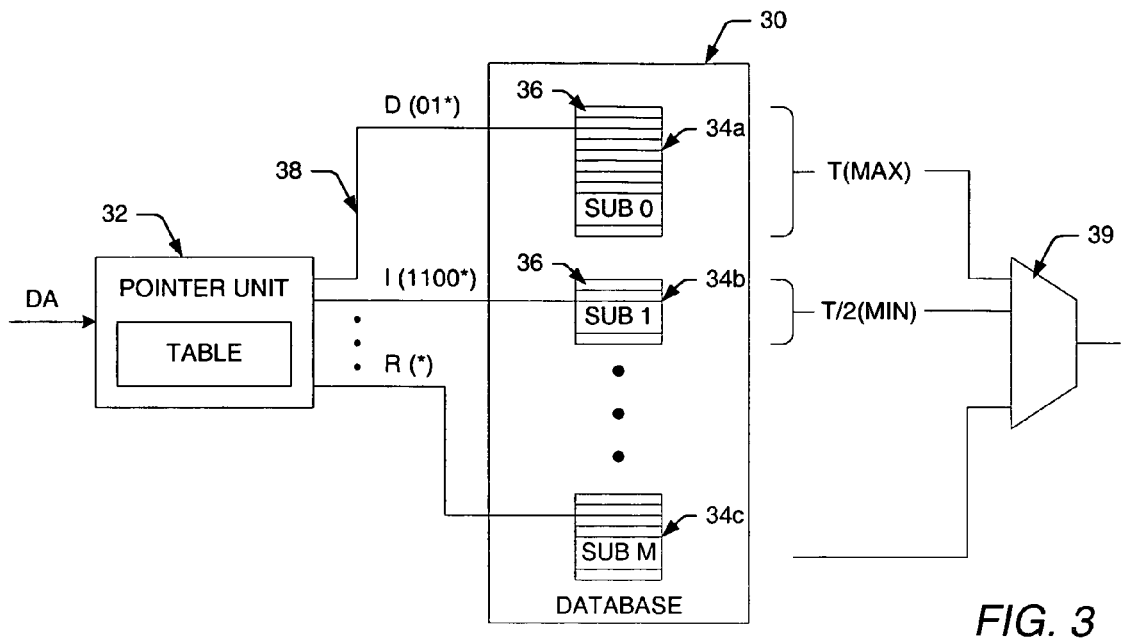
FIG. 3 is a block diagram of a forwarding database, a pointer unit that points an address to a corresponding sub-database within the forwarding database, and a selection unit that selects a next hop address corresponding to the chosen sub-database.

FIG. 3 illustrates an exemplary configuration (or architecture) of the lookup tables described above. More specifically, FIG. 3 illustrates how a pointer unit may be used to match an incoming destination address (DA) to a corresponding sub-database (SDB) by matching more significant bits of the address to prefixes within the pointer table, and then matching less significant bits of the address to prefixes within the sub-database pointed to by the pointer unit. The routing table is shown in FIG. 3 as forwarding database 30 and is preceded by a pointer unit 32. Database 30 is bifurcated or split into a plurality of sub-databases 34. A mechanism that may be used to split database 30 into sub-databases 34 will be described below with regard to FIG. 6. Moreover, an example will be provided to illustrate how the number of prefixes within each sub-database is bounded between a maximum prefix amount, or threshold "T," and a minimum prefix amount, or threshold "T/2." Thus, FIG. 3 illustrates a sub-database 34a that might have a maximum number of prefixes 36. Sub-database 34b might have a minimum number of prefixes 36. Not only are the number of prefixes within each sub-database controlled, but the number of sub-databases 34 within database 30 is also controlled.

As part of the routing table, or preceding the routing table, is pointer unit 32. Pointer unit 32 can include a pointer table having a list of pointers. Each pointer comprises a binary sequence that represents a branch (or "spear") to the appropriate unique binary sequence of a corresponding sub-database. For example, one pointer 38 might point to prefix 01*, where * represents a don't care (or "mask entry"). If the incoming address (DA) begins with 0 followed by 1, then pointer 38 will point to sub-database "D," which contains a bounded number of prefixes that begin with binary sequence 01, followed by a bounded range of other binary combinations. Another pointer (not labeled) may point to sub-database "I", shown as reference numeral 34b in FIG. 3. Sub-database "I" has a binary sequence beginning with 1100, with subsequent binary permutations contained in the number of prefix entries of sub-database "I." The set of pointers represented in the example of FIG. 3 as 01*, 1100*, and * are configured as part of the overall address resolution and are stored within the pointer table of pointer unit 32 for quickly locating a particular SDB. The set of pointers are otherwise referred to herein as "spear prefixes."

It is appreciated that each of the functional units described in FIGS. 2 and 3 may be implemented with hardwired circuitry, Application Specific Integrated Circuits (ASICs), one or more logic circuits, a processor, or any components of a programmed computer that performs a series of operations dictated by software or firmware, or a combination thereof. Importantly, the present invention is not limited to a particular implementation of the functional units, and thus the functional units can achieve their functionality using either hardware, firmware or software.

Figure 5:
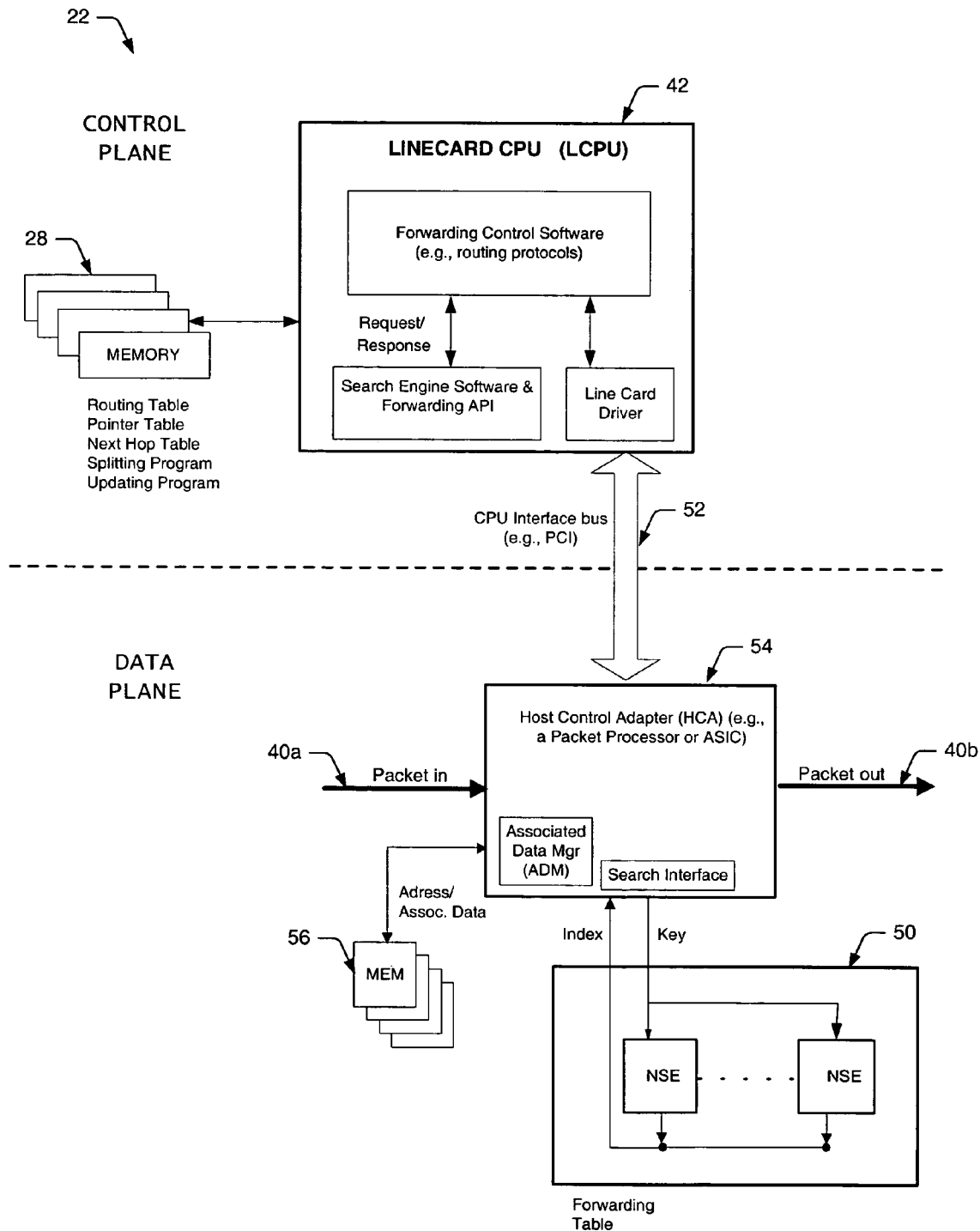
FIG. 5 is a block diagram of various software and hardware components that may be found within one or more line cards of the forwarding device of FIG. 2.

For example, FIG. 5 is a block diagram illustrating one embodiment of a line card that may be included within forwarding device 12. As shown in FIG. 5, line card 22 may contain a Network Search Engine (NSE) chip 50, or another memory management device in the data plane, and supporting components in the control plane of the line card. Line card 22 may also contain a line card CPU (LCPU) 42 for performing management tasks for the other components on the line card. LCPU 42 may alternatively be referred to herein as a central processor. With regard to forwarding, the LCPU 42 runs the control software necessary to compute and maintain the forwarding tables in the NSE chip. In most cases, the control software may be stored in control plane memory (e.g., SRAM or DRAM) 28, which is coupled to LCPU 42. The LCPU may communicate with other line card components using an interface bus 52 (such as a Peripheral Component Interconnect, PCI, bus) either directly, or via a Field Programmable Gate Array (FPGA) or Application Specific Integrated Circuit (ASIC) designed for this purpose. As described below, updates to the routing tables within memory 28 may be performed by forwarding control software (e.g., routing protocols) running on the LCPU.

The Host Control Adapter (HCA) 54 handles and processes packets in the data plane. It could be a custom-designed ASIC or a packet processor. As such, HCA 54 may be otherwise referred to herein as a "local processor". The HCA is responsible for, among other things, parsing the packet, extracting the fields (such as the destination address) to be looked up, and performing the lookup in the forwarding tables within the NSE.

In some cases, a Network Search Engine (NSE) may be considered to include the NSE chip coupled to the HCA, in addition to the search engine software that runs on the LCPU and manages the NSE chip. An NSE can be used in a variety of configurations such as one search engine subsystem on each line card in a distributed architecture, or one search engine subsystem on a centralized card. In a distributed architecture, control plane processing may be required for computing the forwarding table from the routing table. The control plane processing can either be carried out independently on each line card, or on one centralized card.

To perform a search or lookup operation, the NSE block may carry out a simple request-response transaction, usually once every clock cycle. A "request" is a key (or database prefix entry) to be looked up in the forwarding table stored inside a memory management device, such as NSE chip 50. The "response" (sent after a fixed latency) is the index returned by the memory management device to indicate the best matching route for the key. As part of processing the packet, the HCA uses this index to lookup (or locate) the attached memory device 56 (e.g., SRAM or DRAM) that contains any data associated with the forwarding table routes. The lookup to memory 56 is performed using an address derived from the index returned by the NSE, and returns the relevant associated data of the best matching route. The HCA then uses the data to continue performing other packet processing functions. If the associated data information is shared among different routes (which is often the case), there may be an extra level of indirection to get the associated data. For example, once the index returned from the NSE is located in memory 56, another index may be returned that contains the pointer to the associated data for that route.

In one embodiment, NSE chip 50 may be one that is provided by Sahasra Networks, a company acquired by Cypress Semiconductor Corporation. Such a device and associated software may be referred to herein as a "Sahasra NSE device" or as "Sahasra search engine software." However, NSE chip 50 is not limited to such a device in all embodiments of the invention. Rather, any appropriate memory management device may be used in place of NSE chip 50 in other embodiments. The following sequence of steps comprises actions that may be carried out to complete an update operation to a Sahasra NSE device. It is noted that similar steps may be used (with or without modification) to update other memory management devices.

From within LCPU 42, the forwarding control software makes a "request" to add and/or withdraw routes to the Sahasra search engine software through an Application Programming Interface (API). In most cases, the API (and the Sahasra software) may be a single-threaded, simple request-response library of function calls. The Sahasra software processes the request, incrementally recomputes the data structures, and generates a list of changes to be made in the NSE as a result of the route updates to the data structure. These changes are essentially a set of update instructions (such as a 'write' instruction) to the forwarding tables within the NSE. This "update list" is then returned to the forwarding control software as a "response" to the update request.

The Sahasra software also manages the index space associated with each route in the NSE. Therefore, route updates resulting in changes in the NSE, could also result in changes to other memory management devices attached to the HCA (e.g., other types of NSEs, such as TCAMs). The changes made to other memory management devices may also be computed by the Sahasra software and sent to the forwarding control software. All changes, to both the NSE and to associated memory device 56, are consolidated as one logical stream of update requests meant for hardware and sent to the forwarding control software. In some cases, the forwarding control software may augment the logical stream before sending it to the line card driver software layer that sends the update requests over the LCPU interface bus to the HCA.

Once received by the HCA, the software update requests from the LCPU are forwarded to the NSE or to the associated memory device, depending on the destination of the update request. For reasons described below, it is generally desirable that searches not be stopped while updates are being sent to the NSE. In other words, the HCA should be free to interleave the search and update requests in any fashion.

Figure 4:
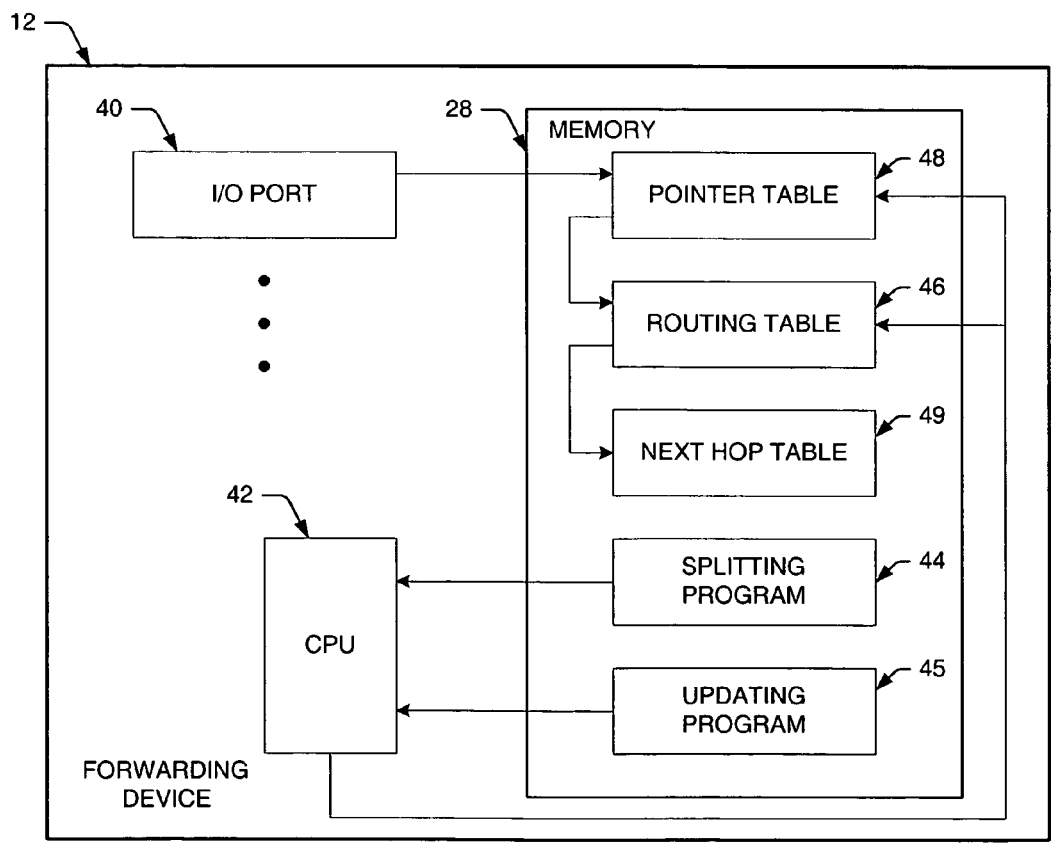
FIG. 4 is a block diagram of the forwarding device of FIG. 2, including a computer storage medium, a processor and multiple input/output ports.

FIG. 4 illustrates an exemplary memory allocation within forwarding device 12. More specifically, FIG. 4 shows a block diagram of an exemplary computer readable storage medium 28 within the forwarding device, which may be used to store a splitting program and one or more updating programs. As described in more detail below, splitting program 44 may be used by a central processor (e.g., LCPU 42) to configure the pointer table 48 and the sub-databases within the routing table of FIG. 3. An updating program 45 may be subsequently selected by the central processor for incrementally updating the routing table in an online fashion. In some cases, however, the splitting program 44 and/or the updating programs 45 may be run by a local processor (e.g., HCA 54).

As shown in FIG. 4, forwarding device 12 includes multiple input/output ports 40 that communicate with other forwarding devices within the network. The processor (e.g., LCPU 42) in the illustrated implementation can be called upon to fetch a splitting program 44 within memory 28. When executed on processor 42, the forwarding database of the routing table is split into sub-databases of bounded size and number. The mechanism by which the database is split will be described in more detail below. Once split, processor 42 will configure the sub-databases within routing table 46 and store the pointers within pointer table 48. When address searching is performed, the incoming address will initially be sent to pointer table 48 via I/O port 40.

An appropriate pointer may then be selected based on a match of the longest prefix within of the more significant binary bits of the incoming address. The selected pointer will point, therefore, to an appropriate sub-database within routing table 46. Another longest prefix match operation will be undertaken to determine the longest matching prefix within only that sub-database. Once determined, the longest-matching prefix will point to a corresponding next hop entry. As shown in FIG. 3, the outcome of the lookup operation will be sent to a selector, which will then select the next hop identifier recognizable by the switching fabric of FIG. 2. The next hop address selector is shown as reference numeral 39 in FIG. 3, and the next hop table stored in memory 28 is shown as reference numeral 49.

Figure 6:
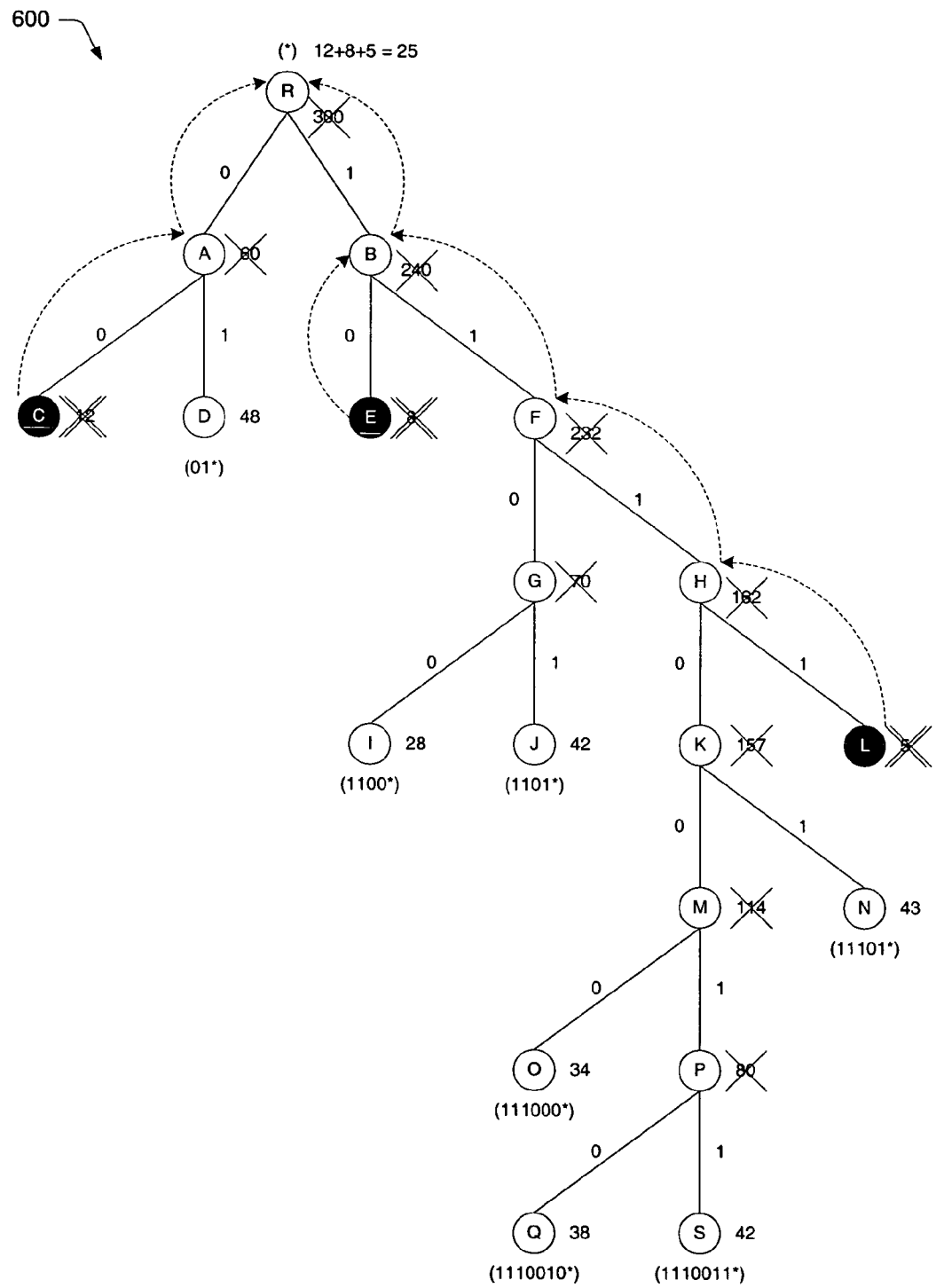
FIG. 6 is a plan diagram of a binary tree representation of an exemplary forwarding database having N number of prefixes divided among no more than $2N/T+1$ number of sub-databases.

FIG. 6 is a plan diagram of a binary tree having N number of prefixes within a database bounded into no less than N/T sub-databases and no more than 2N/T+1 sub-databases, with a binary spear entry pointing to each respective sub-database. In particular, FIG. 6 illustrates how the splitting program 44 (FIG. 4) may utilize a binary tree to generate the pointer prefix entries (hereinafter "spear entries"), as well as the sub-database prefix entries (hereinafter "prefixes" or "prefix entries"). Other types of tree (or "trie") structures may be used in alternative embodiments of the invention. As shown in FIG. 6, the prefix entries within forwarding database 30 (FIG. 3) can be represented in binary tree data structure 60, where each node or vertex represents a binary string comprising 1s and 0s. The root node (R) is the null string represented as an asterisk (*). Two pointers originate at each node. The first pointer consists of the current binary string plus a 0, whereas the second pointer consists of the current binary string plus a 1.

In the embodiment of FIG. 6, splitting program 44 may be used to divide (or "split") forwarding database 30 into a bounded number of sub-databases, each containing a bounded number of prefix entries. As noted above, the number of sub-databases may be bounded by N/T and 2N/T+1, where "N" is the total number of prefix entries in the forwarding database and "T" is the maximum number of prefix entries allowed in each sub-database. In some cases, the number of prefix entries within each sub-database may be bounded by, e.g., T/2 and T. Alternative bounding thresholds may be used in other cases.

Assume, e.g., that forwarding database 30 includes N=300 prefix entries. Beginning at the root node (R) of the 300 prefixes, the prefixes are divided into nodes A and B depending on the binary value at the most significant bit (MSB) location. Assume also that no more than T=50 prefixes are allowed in each node (or sub-database). Since node A (e.g., 60 prefixes) and node B (e.g., 240 prefixes) each contain more than 50 prefixes, nodes A and B are split once more according to the binary value at the bit location immediately preceding the MSB location. The splitting process continues until subsequent nodes are produced having no more than the maximum number of prefix entries, which in this example is 50. Reference can be made to the co-pending application for a more in-depth discussion of the splitting process of FIG. 6.

Nodes containing less than the maximum number of prefix entries (T) can be thought of as "leaf nodes". Thus, the leaf nodes of FIG. 6 comprise nodes C, D, E, I, J, O, Q, S, N and L. Not all leaf nodes, however, will contain sub-databases. Some leaf nodes may contain a number of prefix entries that are less than the minimum amount. For example, the minimum number of prefixes might be T/2, or 25 in the current example. As shown in FIG. 6, the splitting program may result in leaf nodes C, E and L each having a number of prefixes less than 25. These nodes may be merged with sub-databases in higher levels of the tree hierarchy in a subsequent merging process. Reference can be made to the co-pending application for a more in-depth discussion of the merging process of FIG. 6.

As a result of the splitting/merging process of FIG. 6, binary tree 60 produces 8 leaf nodes corresponding to 8 appropriately bounded sub-databases. The number of prefixes within each sub-database of nodes D, I, J, O, Q, S, N and R are shown to the right of each leaf node, and the spear entry within the pointer table (which points to that sub-database) is shown in parenthesis beneath each leaf node. The 8 sub-databases have no more than T prefixes and no less than T/2 prefixes, in the example shown. In addition, the number of sub-databases may be chosen so as not to exceed 2N/T+1 or be less than N/T. In the example shown, 2N/T+1=600/50+1=13 and N/T=300/50=6. Since 8 sub-databases were produced, and 8 falls within the boundary of 6 to 13, the sub-databases may be considered "appropriately bounded."

The maximum number of prefixes, T, can be chosen as any predetermined number to achieve a particular prefix matching characteristic, such as higher search speed, lower storage requirement, lower preprocessing time, and lower update time. For example, T could be made larger to reduce the number of sub-databases within the forwarding database. Adjustments to T can, therefore, render scalability and flexibility to the search mechanism.

Unfortunately, the splitting/merging process of FIG. 6 can only be performed when the entire forwarding database is "known" and, therefore, cannot be used to incrementally update the database in an online fashion. In some cases, the splitting/merging process of FIG. 6 may be performed by execution of the "Static Split-Merge" (SSM) algorithm (i.e., splitting program 44) described in the co-pending application. Unfortunately, every time there is an update to a route in the routing table, the SSM algorithm needs to be run again on the whole database to construct the new partition. This tends to consume considerable system resources, and is slow to execute in both software and hardware implementations. In some cases, for example, the SSM algorithm may achieve less than 1 update per second in a worst-case scenario. In addition, the SSM algorithm does not permit the HCA to interleave searches and updates because of the length of time needed to perform such tasks. Since the NSE chip cannot accept new searches while updated portions of the database are being downloaded to the chip, the system designer is forced to keep two copies of the forwarding table (which is prohibitively expensive) if the database is to be updated using the SSM algorithm.

As an improvement to the SSM algorithm of the co-pending application, the present discussion provides three algorithms of varying complexity and utilization for incrementally updating a forwarding database in an online fashion. The algorithms described below may be implemented by executing various sequences of computer-readable program instructions, which embody the update methodologies of the algorithms. In some cases, the algorithms may be implemented through execution of one of the updating programs 45 stored within computer readable storage medium 28 of FIG. 3.

The first algorithm is referred to as the 'basic' incremental split merge (BISM) algorithm, the second is referred to as the 'lazy' incremental split merge (LISM) algorithm, and the third is referred to as the 'down support' incremental split merge (DSM) algorithm. As will be described in more detail below, these algorithms may be used to incrementally update one or more database prefix entries stored in a network search engine (NSE), a Ternary Content-Addressable Memory (TCAM), or another memory management device using an associated memory for storing forwarding tables with low overhead. Instructions to add, delete or modify the database prefix entries are supported by all three algorithms. Trade-offs may be made among certain parameters, allowing adaptability to various NSEs, TCAMs or other memory management devices. These parameters may comprise the number of spear entries, the update rate supported, the rate of device utilization, and the algorithms' complexity. Special features of the update algorithms, such as 'hysteresis,' may be supported to provide even better amortized worst-case update performance. Certain instructions, e.g., copy/paste instructions, may be provided as hardware-assisted on-chip functions to further increase performance.

With regard to the 'down support' split merge algorithm, the amount of work done in software (e.g., the number of memory accesses in software) and hardware (e.g., the number of writes to a network search engine) per route update is advantageously bounded by a constant value in the worst-case scenario. The constant value is bounded, deterministic, and known in advance.

The following functionality may be observed by all three update algorithms. First, updates are carried out in-order, and repeated additions or deletions do not have any effect on the routes. In a scenario where route updates are happening in batches, order is maintained across batch boundaries (i.e., the individual updates within the batch may be carried out in any order, as long as the whole batch is completed before the next batch is processed). The order of updates to the same prefix is still maintained (i.e., if the same batch contains four adds and then one delete of the same prefix, p, the forwarding table in the NSE does not contain the prefix p at the end of the batch).

Second, atomicity is required. Updates to the NSE chip are said to be "atomic" in the sense that, for a given search key, K, if a prefix, p, is deleted from the NSE chip during a fixed clock cycle, C, the search engine behaves, for the key K, as if the prefix p was not present before C, but instead becomes present after C. In other words, updates to the chip are said to be "atomic" when the chip provides consistent search results (e.g., prefix, p, should not disappear from the database after a delete and then re-appear without intentional reinsertion of the prefix into the database). The behavior under addition of a prefix may be analogous to the deletion process.

Third, coherency must be maintained to ensure that the on-chip data structure (i.e., the forwarding table) is consistent with the routing table information at all times. For example, an update to a prefix, p1, should not cause searches that would normally lead to a result of p2, where p2 is not nested (i.e., does not overlap) with p1, to give a result other than p2. If p2 is nested with p1, the results are given in accordance with the in-order and atomicity characteristics of the NSE. When coherency is maintained between the forwarding and routing tables, the forwarding table can be dynamically updated without disruption of on-going packet processing.

Fourth, regarding interleaved searches and updates, searches should not stop when updates to the NSE are in progress. The HCA steals some search cycles (detailed below) to carry out the updates to NSE. The Sahasra software takes care of the fact that the update requests it sends to the NSE may be carried out in any arbitrary order relative to the data plane searches. In other words, no assumptions should be made as to the number of searches that may go through the chip between two consecutive write instructions.

Fifth, relevant update parameters such as update throughput and update latency should be tracked to observe performance requirements of the update operation. "Update throughput" is generally measured in the number of route updates a system can handle per second. As noted above, the currently observed update rates in the Internet may range from an average of a few route updates/second to a peak of about a thousand route updates/second. "Update latency" is the amount of time between when a request is made to update a route and the time at which the route is actually added to the forwarding tables within the NSE. At this time, there are no known quantifiable requirements on update latency bounds, as long as they are reasonable (e.g., on the order of seconds). This may be due, in part, to the control plane routing protocol taking several seconds to converge to a set of routes.

From the "update throughput," one can determine the number of NSE interface cycles stolen by the HCA and the LCPU bus bandwidth. The number of NSE interface cycles (i.e., "search cycles") is equivalent to the number of clock cycles stolen from searching at the HCA-NSE interface to support a given update throughput. The LCPU bus bandwidth, on the other hand, is the amount of bandwidth that must be consumed by the interface bus connecting the LCPU to the HCA to support a given update throughput. The LCPU usage (or bus bandwidth) is the proportion of LCPU cycles taken by the forwarding software (e.g., Sahasra software) to maintain the NSE while supporting a given update throughput. It is generally desired for an NSE to maintain high system update throughput and, for a given update throughput, to consume the least amount of NSE interface cycles and LCPU cycles.

As an example of desirable update performance numbers, in an exemplary embodiment of the update algorithm, an NSE may target an update rate of approximately 10,000 route updates/second without taking more than approximately 3% of the search cycles and 60% of LCPU cycles at this update rate.

FIGS. 7, 9, 12, and 13 illustrate various embodiments of the update programs 45 shown in FIG. 4. As will be described in more detail below, each of the update programs may achieve relatively high update throughput while maintaining the functionality requirements listed above. Furthermore, the update programs may be considered a series of algorithms, some of which improve upon those listed before them. In other words, the update algorithms may differ from one another in: the number of spear entries, the update rate supported, the amount of device (e.g., NSE) utilization and the complexity of algorithms. In this manner, the series of algorithms may allow a designer to select suitable performance characteristics for his/her NSE.

Figure 7A:
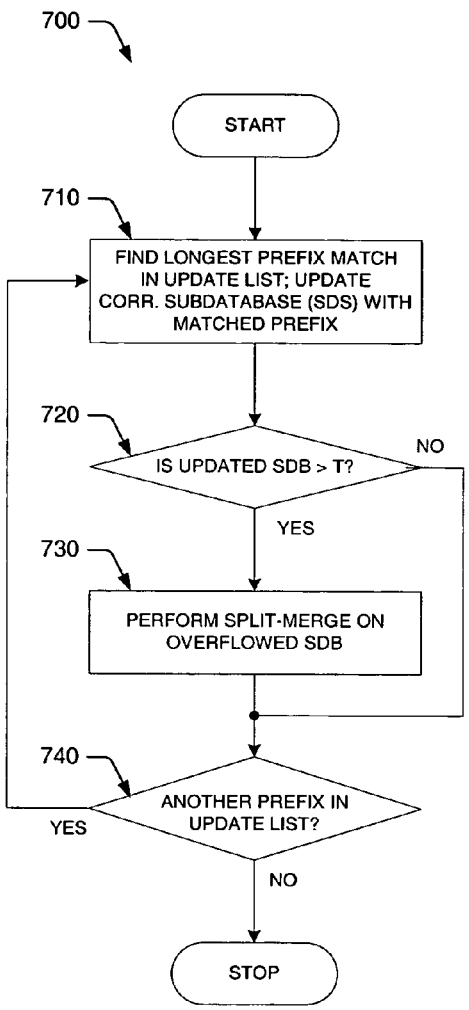
FIG. 7A is a flow-chart diagram illustrating one embodiment of a method for incrementally updating a forwarding database in an online fashion.
Figure 7B:
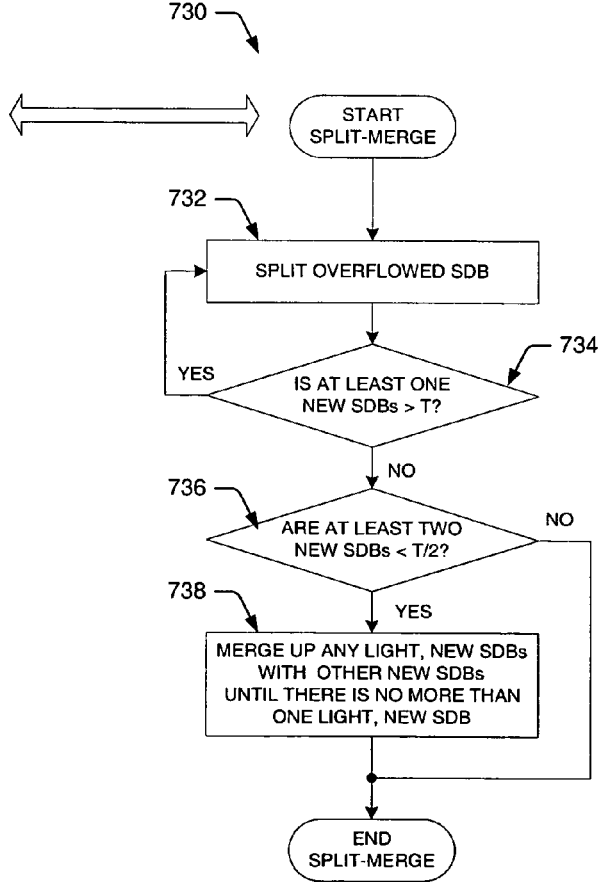
FIG. 7B is a flow-chart diagram illustrating an exemplary method for performing a "Split-Merge" operation on an overflowed sub-database.
Figure 8:
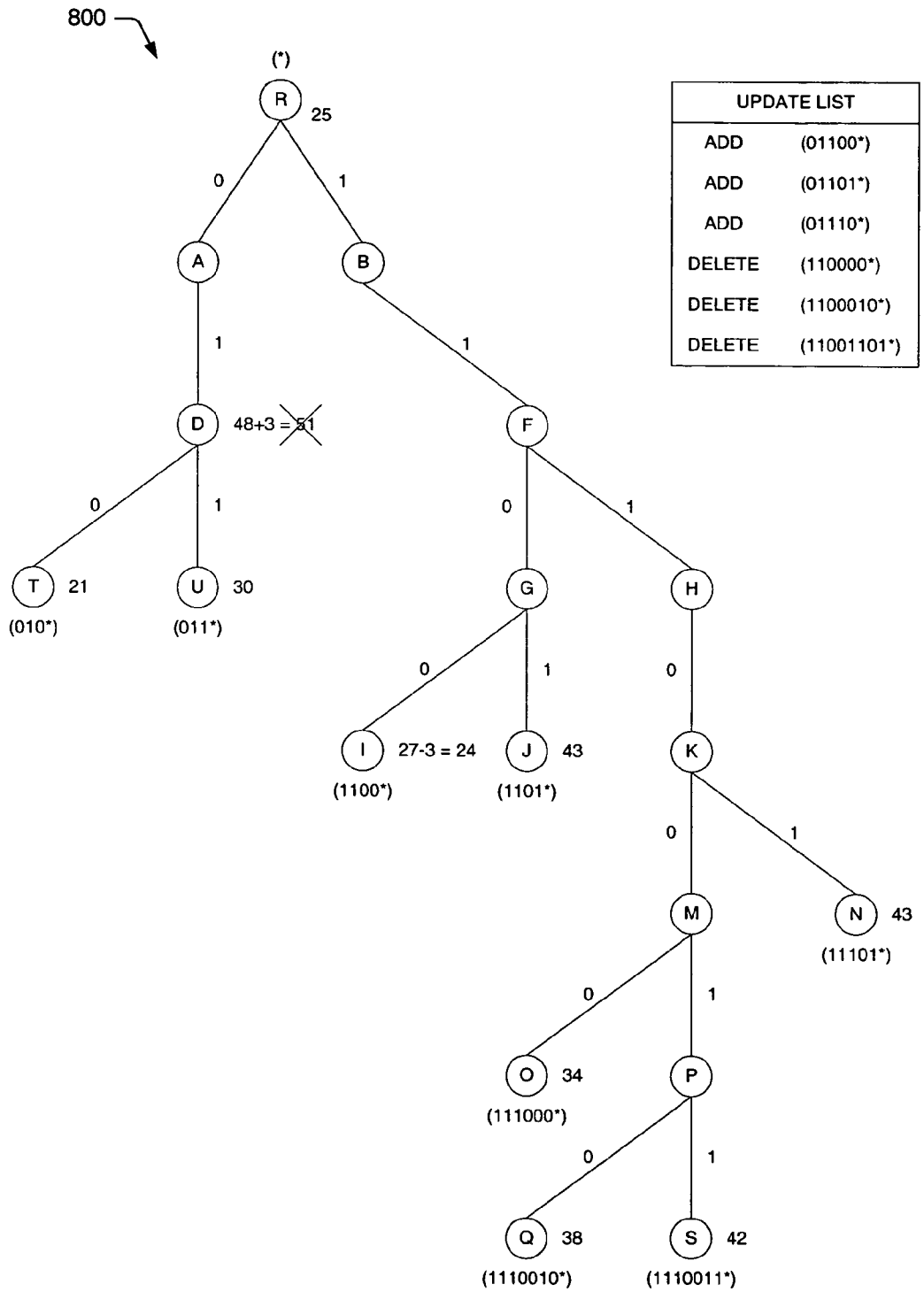
FIG. 8 is a plan diagram showing exemplary results that may be obtained by performing the method of FIG. 7 on the binary tree of FIG. 6.

Turning to FIGS. 7 and 8, one embodiment of the update program is described herein as the Basic Incremental Split-Merge (BISM) algorithm. In particular, FIG. 7A illustrates an exemplary flow-chart diagram of BISM update algorithm 700. FIG. 8, on the other hand, illustrates one example of a binary tree 800 that may be formed in accordance with the BISM update algorithm of FIG. 7.

Referring to FIG. 7A, BISM update algorithm 700 may begin (in step 710) by finding the longest matching prefix in an update list. As noted above, the update list may be generated by control plane software for updating a forwarding database stored within a data plane hardware component. In the binary tree structure of FIG. 8, longer prefixes are positioned closer to leaf nodes, whereas shorter prefixes are positioned closer to the root node of the binary tree. The sub-database corresponding to the longest matching prefix may also be updated (in step 710) by adding, deleting or modifying the prefix in the sub-database. If there are no other prefix entries in the update list (step 740), the method may end, but only if the updated sub-database (SDB) contains fewer than a maximum number (e.g., T) of prefix entries (step 720).

Like all other update algorithms described herein, the number chosen for T may be any predetermined number that achieves a particular prefix matching characteristic, such as higher search speed, lower storage requirement, lower pre-processing time, and lower update time.

A sub-database having more than the maximum number of prefix entries is referred to herein as an "overflowed" SDB. If the updated SDB contains more than T number of prefixes (in step 720), the overflowed SDB may be split-merged to create two or more new SDBs (in step 730). As shown in FIG. 7B, the split-merge operation may begin by splitting the overflowed SBD (in step 732). The splitting process may then continue (in steps 732, 734) until each of the newly created SDBs has fewer than T number of prefix entries. In some cases, the splitting process may result in more than one exception sub-database. As used herein, an "exception" sub-database or "light" sub-database is one having less than the minimum number (e.g., T/2) of prefix entries. If more than one newly created sub-database is determined to be light (in step 736), a merging process is invoked (in step 738). During the merging process, any light, newly created SDBs are merged upwards and combined with other newly created SDBs until no more than one light, newly created SDB exists within the updated SDB.

The BISM algorithm of FIG. 7A improves upon the Static Split-Merge (SSM) algorithm of the co-pending application. For example, the BISM algorithm does not perform a split-merge operation on the entire database, but instead, performs the split-merge operation only on the affected portion(s) of the binary tree data structure. Assume, for example, that a prefix is added to the forwarding database. If the prefix is added to a sub-database, such that the sub-database is still less than the maximum threshold size of the sub-database, there is no need to perform a full split-merge operation. If, however, the sub-database exceeds the maximum threshold size, a split-merge operation may be performed only on the overflowed sub-database, rather than the entire forwarding database.

As noted above, the Static Split-Merge (SSM) algorithm guarantees that newly created sub-databases will be less than T, or the threshold placed on the maximum size of the sub-databases. Given this, the number of spear entries or sub-databases (Ns) will be less than 2N/T+1, where N is the total number of routes (i.e., prefix entries) in the forwarding database. The SSM algorithm reconfigures the forwarding database of N prefix entries such that each sub-database, except possibly one closest to the root of the tree (on which the SSM was done), is less than T and at least T/2 in size. This so-called "exception" sub-database could be less than T/2 in size, which contributes to the '+1' in the '2N/T+1' formula given above.

In some cases, BISM algorithm 700 may be performed to add a new prefix entry to an empty database (e.g., to create the initial representation of a forwarding database). In other cases, however, BISM algorithm 700 may be performed to incrementally update a forwarding database once the SSM algorithm (or the BISM algorithm) has been used to create an initial representation of the database. For example, the BISM algorithm may be performed on a sub-database of $N_1$ entries that overflowed to greater than T entries after one or more updates were made to the forwarding database. After splitting the overflowed sub-database, the number of spear entries (or newly created sub-databases) could be as much as $2N_1/T+1$, where $N_1$ is less than N. Unlike the SSM algorithm, however, the BISM algorithm does not attempt to do anything further to the newly created exception sub-database. This enables the BISM algorithm to perform updates while doing the least amount of work. However, the BISM algorithm may cause several exception sub-databases to accumulate in the tree over time, which may ultimately reduce the speed of the look-up operation.

FIG. 8 is a plan diagram of a binary tree 800 formed in accordance with the SSM algorithm of FIG. 6 and updated in accordance with the BISM algorithm of FIG. 7. Prior to the update process, binary tree 800 may be similar to binary tree 600, in that binary tree 800 may represent a forwarding database containing N=300 prefixes bounded into no less than N/T and no more than 2N/T+1 sub-databases. Assuming T=50, the N number of prefixes are initially bounded between N/T=6 and 2N/T+1=13 sub-databases. In addition, a spear entry pointing to each respective sub-database may be stored in a pointer table, so that a particular sub-database may be quickly located.

An exemplary update list is provided in FIG. 8 for modifying portions of the forwarding database that are affected by route updates. As a result of the update list and BISM algorithm 700, binary tree 800 may produce 9 leaf nodes corresponding to 9 appropriately bounded sub-databases. The number of prefixes within each sub-database of nodes T, U, I, J, O, Q, S, N and R are shown to the right of each leaf node, and the spear entry within the pointer table (which points to that sub-database) is shown in parenthesis beneath each leaf node.

In the exemplary update list of FIG. 8, three prefix entries may be incrementally deleted from node I, and three prefix entries may be incrementally added to node D. If the additions cause node D to overflow (e.g., to contain more than T prefix entries), the prefix entries within node D may be repeatedly split into new leaf nodes until all newly created leaf nodes contain less than the maximum number of prefixes. In the current example, the 51 prefix entries of node D are split into leaf nodes T (containing, e.g., 21 prefixes) and U (containing, e.g., 30 prefixes). Since only one of the newly created leaf nodes is light (i.e., node T contains less than T/2 prefix entries), the merging process is not invoked and node T remains a leaf node. The deletions in the update list (which may be performed prior to the additions) also caused node I to become light. Even though node I contains fewer than the minimum number of prefix entries, it was not merged up towards root node R, since the split-merge operation is confined by the BISM algorithm to only the affected portion(s) of the database.

Figure 9:
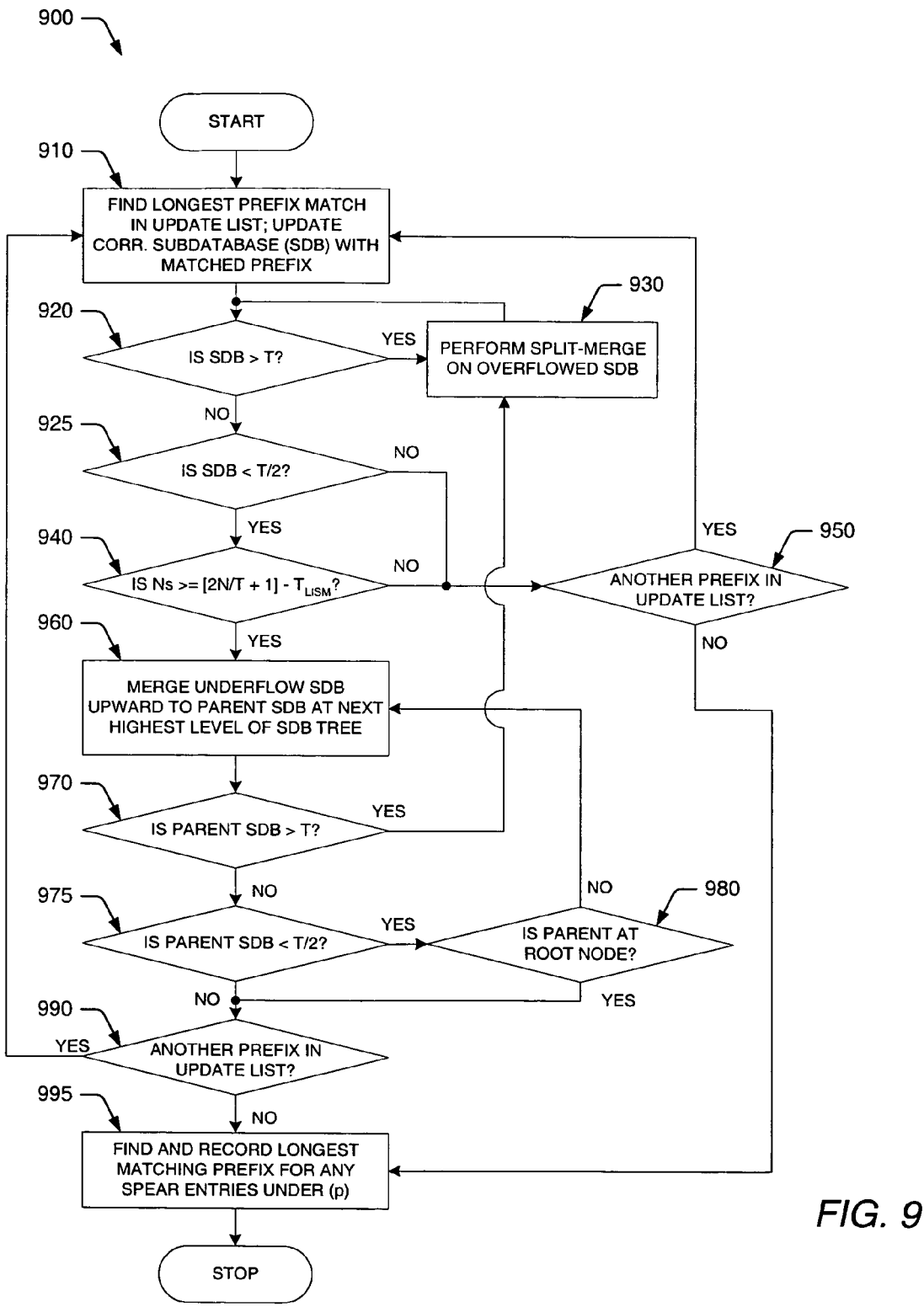
FIG. 9 is a flow-chart diagram illustrating another embodiment of a method for incrementally updating a forwarding database in an online fashion.
Figure 10:
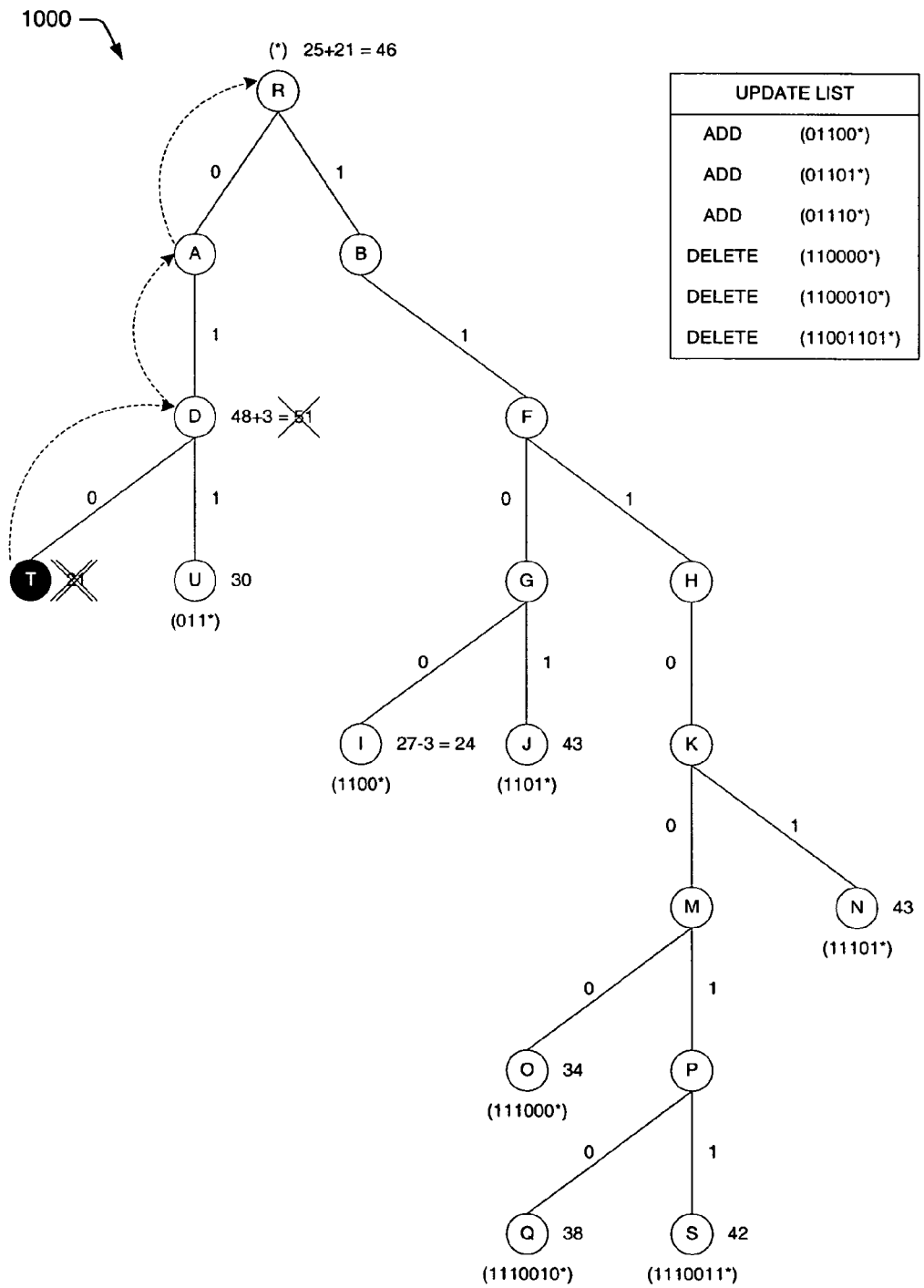
FIG. 10 is a plan diagram showing exemplary results that may be obtained by performing the method of FIG. 9 on the binary tree of FIG. 6.
Figure 11:
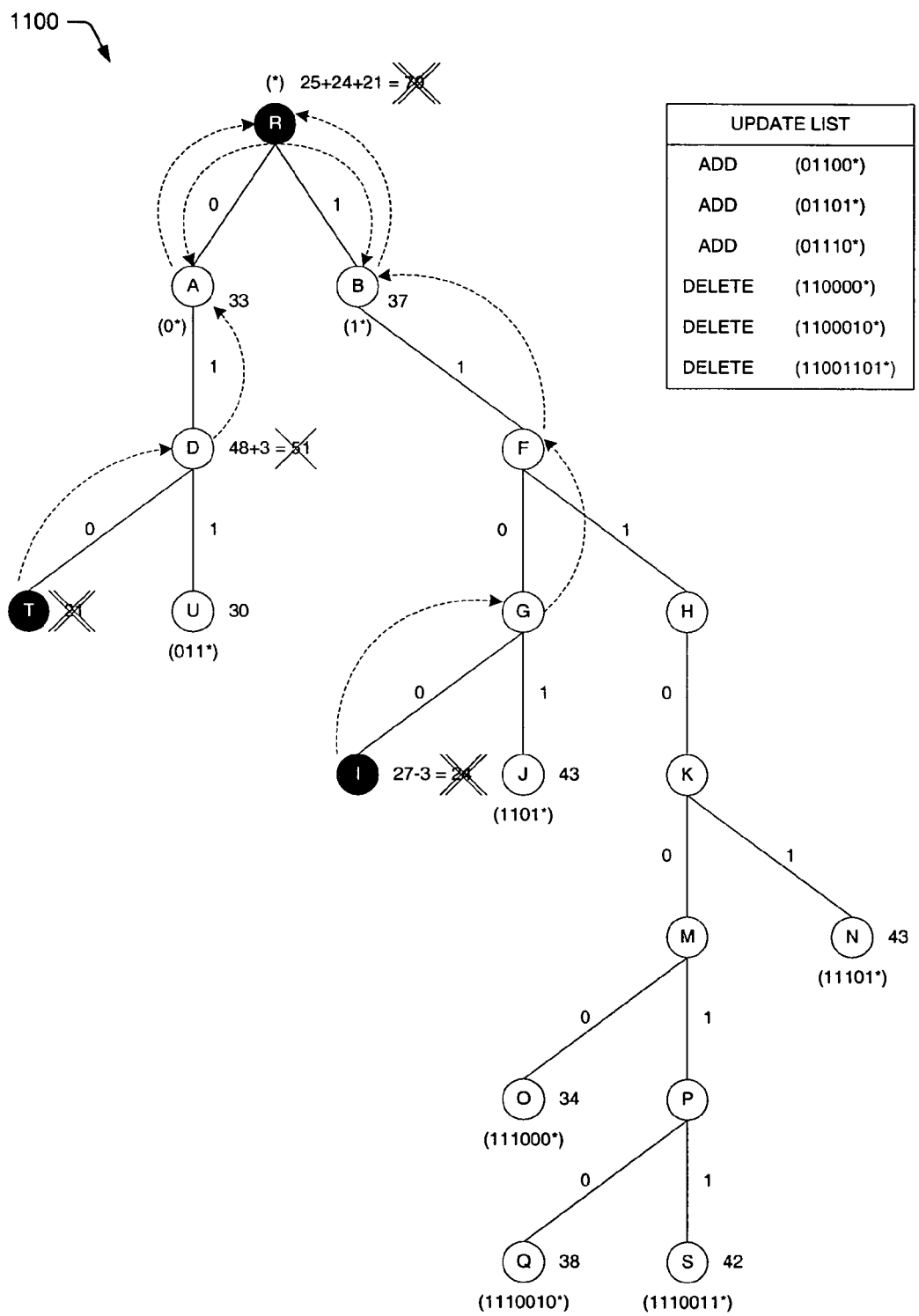
FIG. 11 is another plan diagram showing exemplary results that may be obtained by performing the method of FIG. 9 on the binary tree of FIG. 6.

Turning now to FIGS. 9-11, another embodiment of the update program is described as the Lazy Incremental Split-Merge (LISM) algorithm. In particular, FIG. 9 illustrates an exemplary flow-chart diagram of LISM update algorithm 900. FIGS. 10 and 11 illustrate various examples of binary tree structures that may be formed in accordance with the LISM update algorithm of FIG. 9.

In some embodiments, the LISM algorithm of FIG. 9 may be used to add a new prefix entry to an empty database (e.g., to create the initial representation of a forwarding database). In other cases, however, the LISM algorithm may be selected to incrementally update a forwarding database once the SSM algorithm (or the LISM algorithm) has been used to create an initial representation of the database. However, the LISM algorithm improves upon the BISM algorithm by "lazily" processing any exception sub-databases that may be created by the algorithm. A "lazy" processing of the exception sub-databases, may depend on, for example, the total amount of space available in the forwarding database.

As noted above, the forwarding database is initially provisioned to contain at most 2N/T+1 entries. However, exception databases may be created after a sequence of updates that cause an increase in the number of sub-databases to come close to, or exceed, this maximum bound. If the LISM algorithm decides to process the exception sub-databases, one or more of the exception sub-databases will be merged upwards (with its parent node) towards the root of the tree, as long as the size of the newly merged sub-database is not between ceil(T/2) and T. In other words, if the size of the newly merged sub-database is between T/2 and T, the merge need not take place. If the newly merged sub-database is greater than T, it is split-merged; if the newly merged sub-database is less than ceil(T/2), it continues merging upwards; otherwise, the merge-up process is stopped.

Referring to FIG. 9, LISM update algorithm 900 may begin (in step 910) by finding the longest matching prefix in an update list. In order to compare the various algorithms described herein, the update list shown in FIG. 8 may be used in the examples of FIGS. 10 and 11. A sub-database corresponding to the longest matching prefix may also be updated (in step 910) by adding, deleting or modifying the prefix in the sub-database. If there are no other prefix entries in the update list (step 950), the method may end after the longest matching prefix is found and recorded (in step 995) for all spear entries that were affected by the update process, but only if the updated sub-database (SDB) contains more than a minimum number (e.g., T/2) and fewer than a maximum number (e.g., T) of prefix entries (steps 920 and 925). If the updated SDB contains more than the maximum number of prefix entries, however, the updated SDB is split-merged (in step 930) according to the process described above in FIG. 7B. The method may then determine if any of the newly created SDBs (i.e., the SDBs created by the split-merge process) contain more than the minimum number of prefix entries (in step 920) or fewer than the maximum number of prefix entries (in step 925).

A sub-database having fewer than the minimum number of prefix entries is referred to herein as an "underflowed" SDB. If an updated (or newly created) SDB contains fewer than T/2 number of prefixes (in step 925), the underflowed SDB may be merged up towards the root node (in step 960), but only if the total number of sub-databases is nearing, or exceeding, the maximum number of sub-databases (in step 940). In other words, the process of merging underflowed SDBs to higher levels of the binary tree structure may only occur if the total number (Ns) of sub-databases is greater than or equal to the maximum number (2N/T+1) of sub-databases minus some threshold value ($T_{LISM}$). Though $T_{LISM}$ must be less than 2N/T+1, substantially any threshold value may be selected to obtain a desirable balance between the update time and the amount of work done to perform the update.

If the condition of step 940 is not met, the underflowed SDB will not be merged up into higher levels of the binary tree structure, and the method may end, if there are no other prefix entries in the update list (step 950). Otherwise, the method may continue (in step 910) with the next prefix entry in the update list. Before ending, however, the method may find and record the longest matching prefix (in step 995) for all spear entries that were affected by the update process.

If the condition of step 940 is met, the underflowed SDB may be repeatedly merged up towards and combined with a parent node until: (1) the combined size of the underflowed SDB and any parent nodes merged therewith is between T/2 and T, or (2) the underflowed SDB and any intervening parent nodes are merged with the root node (steps 960, 970, 975 and 980). If, along the way to the root node, the underflowed SDB is merged with a parent node(s), such that the combined size is greater than T, the now overflowing parent node will be split-merged (in step 930), as described above in FIG. 7B. The method may end upon conclusion of the merging process if no other prefix entries exist in the update list (step 990); otherwise, the method continues (in step 910) with the next prefix entry in the update list. Before ending, however, the method may find and record the longest matching prefix (in step 995) for all spear entries that were affected by the update process.

It is noted that the $T_{LISM}$ threshold value may not necessarily be used in alternative embodiments of the LISM algorithm. For example, the process of merging might be contingent on the total number (Ns) of sub-databases simply being greater than or equal to the maximum number (2N/T+1) of sub-databases. On the other hand, the process of merging may be performed upon expiration of a predetermined time period, in which no merging processes were performed by the LISM algorithm. In some cases, the condition set by the LISM algorithm for determining when to perform a merging process may combine the ideas of sub-database thresholds and predetermined time periods.

Binary trees 1000 and 1100 show results that may be obtained using the exemplary update list with LISM algorithm 900. As shown in FIG. 10, binary tree 1000 may produce 8 leaf nodes (i.e., nodes U, I, J, O, Q, S, N and R) when $T_{LISM}$=4. Setting the $T_{LISM}$ threshold value equal to 4 enables leaf node T to be merged up towards root node R after update operations to node D cause node D to split (since the total number of leaf nodes after the split is Ns=9, which is equal to 2N/T+1−$T_{LISM}$=9). Even though node I was also updated (prior to the additions to node D) to contain fewer than the minimum number of prefix entries, the update operations to node I did not invoke the merging process, since the total number of leaf nodes before splitting node D (at that point, Ns=8) was less than 9.

The number of leaf nodes ultimately produced by the LISM algorithm may be changed by modifying the $T_{LISM}$ threshold value. For example, a binary tree may produce fewer or greater number of leaf nodes, typically by increasing or decreasing the $T_{LISM}$ threshold value, respectively. However, this is not always the case. For example, binary tree 1100 illustrates the case in which the same number of leaf nodes are produced (i.e., nodes U, J, O, Q, S, N, A, and B) even though the $T_{LISM}$ threshold value is increased from 4 to 5. Even though the higher threshold value enables leaf nodes I and T to both be merged with root node R, the total number of leaf nodes (Ns) remains 8, since the merging of nodes I and T caused the number of prefixes at root node R to become greater than the maximum number of prefixes (e.g., T=50), thereby requiring those prefixes to be split-merged amongst nodes A and B.

The LISM algorithm is expected to work well with "real-life" update patterns. However, and as illustrated in FIG. 11, the LISM algorithm may potentially result in a large number of split-merge operations, depending on the particular update pattern. Unfortunately, a split-merge is computationally expensive, causing about T prefixes to be "touched." With a tree depth of W, the theoretical worst-case number of prefixes that may be touched by the LISM algorithm is W*T (if, e.g., split-merge operations are performed in the lowest level of the tree). Though this is still much better than N (i.e., the number of prefixes "touched" under the SSM algorithm), it is still a rather large worst-case number per route update.

In a preferred embodiment, the Down-support Split-Merge (DSM) algorithms of FIGS. 12 and 13 may be used to add a new prefix entry to an empty database (e.g., to create the initial representation of a forwarding database). In other cases, however, DSM algorithm may be used to incrementally update a forwarding database once the SSM algorithm (or the DSM algorithm) has been used to create an initial representation of the database. However, the DSM algorithm improves upon the LISM algorithm by allowing no more than one split-merge operation plus one additional merge-up operation to be performed in the worst-case scenario. As will be described in more detail below, an exception sub-database (or "light" spear entry) may be allowed if it can be supported by a 'sufficiently heavy' sub-database (or "support" spear entry), so that the two sub-databases together are sized greater than T. This enables the pair to observe the minimum T/2 per sub-database boundary condition.

Before delving into the DSM algorithm, it is helpful to understand that updates may be classified as either "good updates" or "bad updates." As used herein "good updates" are those updates which can be carried out in a single SDB without the need for splitting/merging the SDB, whereas "bad updates" are those which require splitting/merging of one or more SDBs. In other words, good updates can be performed by simply doing an incremental update (e.g., an add or delete) to the SDB without invoking the split-merge algorithm of FIG. 7B. This can usually be done in-place to achieve low-overhead updates. Bad updates, on the other hand, cause the split-merge algorithm of FIG. 7B to be invoked, and therefore, are more computationally expensive to perform.

For ease of understanding, changes to the software data structures will be initially described for the DSM algorithm. Later text will explain how these changes are reflected in one or more hardware components while maintaining coherency and atomicity. Also, a single incremental add (FIG. 12A) and a single incremental delete (FIG. 13A) will be looked at as special cases, because they are easier to understand, and because they are used in the worst-case analysis of update performance.

Figures 12A, 12B, 12C:
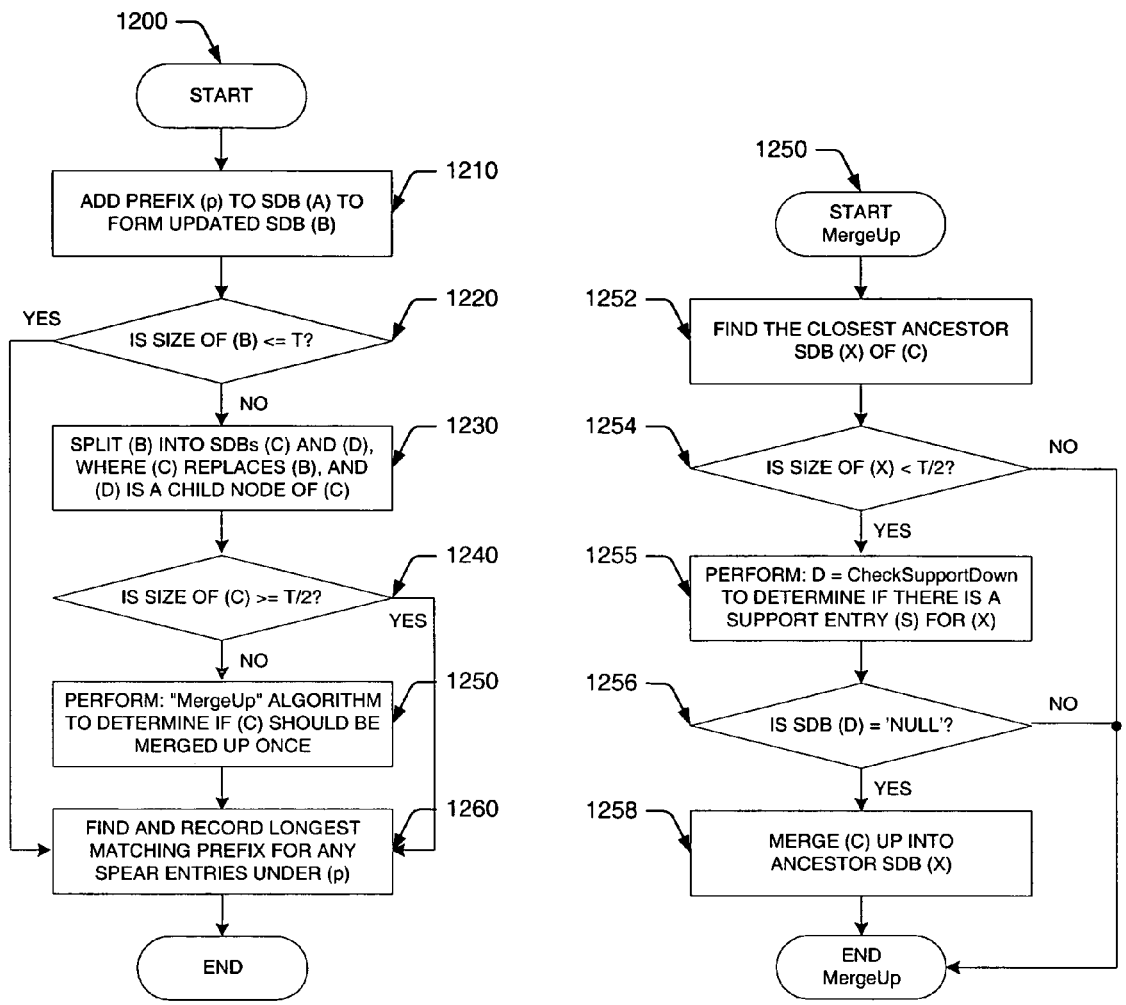
FIG. 12A is a flow-chart diagram illustrating yet another embodiment of a method for incrementally updating a forwarding database in an online fashion.
FIG. 12B is a flow-chart diagram illustrating an exemplary method for performing a "MergeUp" operation on an underflowed sub-database.
FIG. 12C is a flow-chart diagram illustrating an exemplary method for performing a "CheckSupportDown" operation on an underflowed sub-database.
Figure 13A:
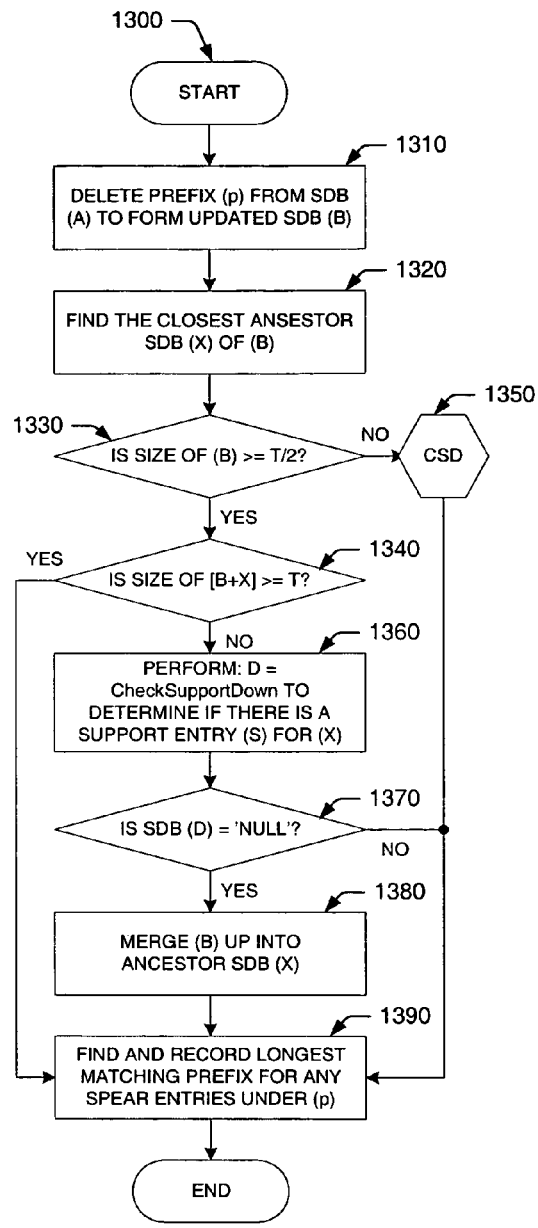
FIG. 13A is a flow-chart diagram illustrating a further embodiment of a method for incrementally updating a forwarding database in an online fashion.
Figure 14:
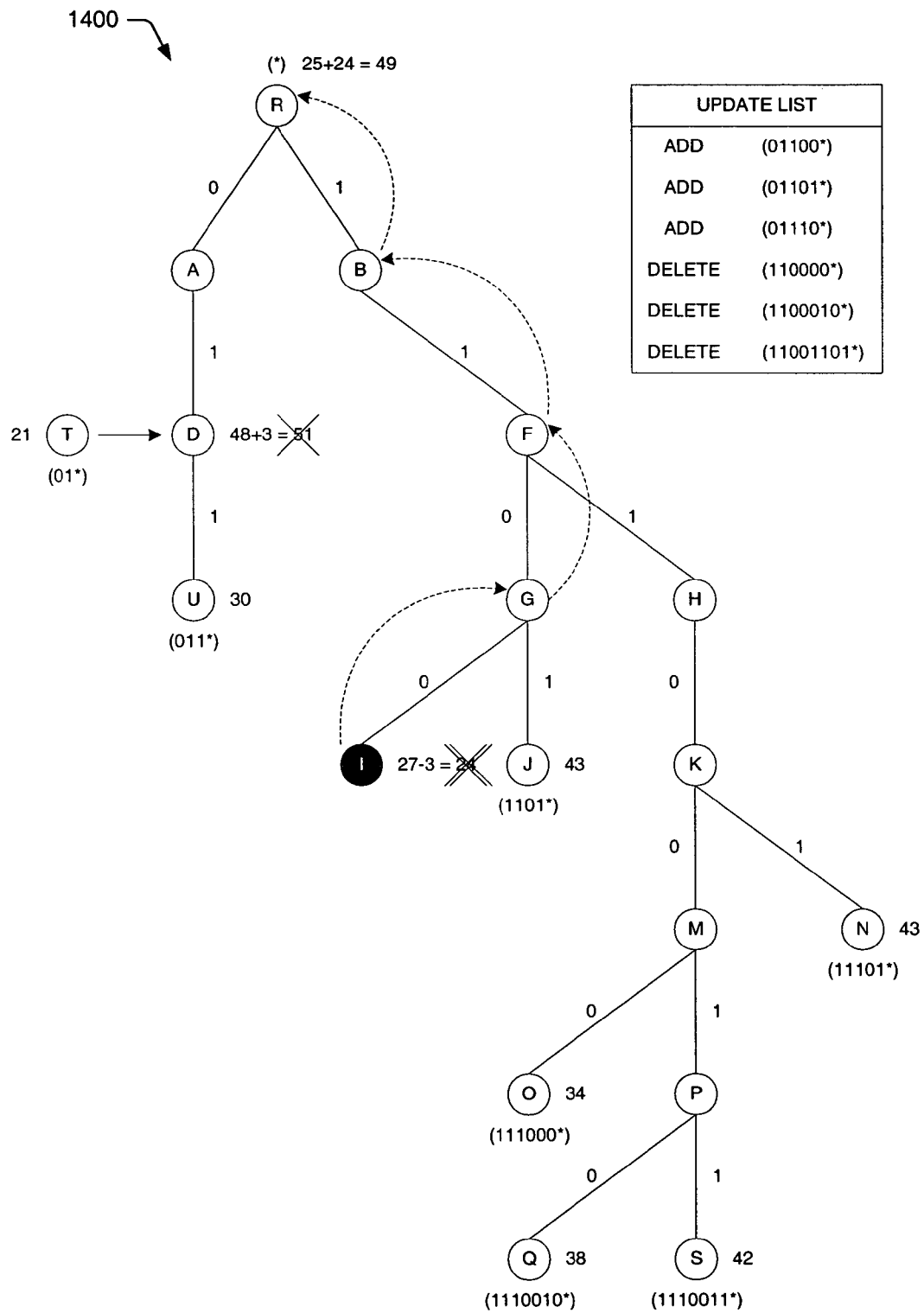
FIG. 14 is a plan diagram showing exemplary results that may be obtained by performing the methods of FIGS. 12 and 13 on the binary tree of FIG. 6.

Exemplary flow-chart diagrams of the incremental add and incremental delete DSM update algorithms are shown in FIGS. 12A and 13A, respectively. FIG. 14 illustrates an exemplary binary tree that may be formed in accordance with the add and delete DSM update algorithms.

Referring to FIG. 12A, the incremental add DSM update algorithm 1200 may begin (in step 1210) by adding a prefix (p) to a sub-database (A) to form an updated sub-database (B). If the size of updated SDB (B) is less than or equal to the maximum number (e.g., T) of prefix entries (in step 1220), the method may end after the longest matching prefix is found and recorded (in step 1260) for all spear entries that were affected by the addition of prefix (p) to SDB (A). This is considered a "good update", since no further processing is required to incrementally add the prefix (p). Various processes for performing "bad updates" are described in more detail below.

If the size of updated SDB (B) is greater than T, the prefix entries of SDB (B) may be split (in step 1230) among a pair of nodes labeled, for instance, C and D. However, instead of nodes C and D becoming children of node B (as in previous algorithms), node C may replace SDB (B), while node D becomes a child of node C. Next, it is determined whether the size of SDB (C) is greater than or equal to a minimum number (e.g., T/2) prefix entries (in step 1240). If the size of SDB (C) is greater than or equal to T/2, the method may end after the longest matching prefix is found and recorded (in step 1260) for all spear entries that were affected by the addition of prefix (p) to SDB (A). In this case, the DSM algorithm required only one split operation to accommodate added prefix (p).

SDB (C) may be considered a "light" SDB, if the size of SDB (C) is less than T/2 (in step 1240). In such a case, SDB (C) may be merged up towards and combined with one of its' ancestors, if a sufficiently heavy SDB cannot be found to support it (in step 1250). As shown in FIG. 12B, the "MergeUp" operation may begin by finding the closest ancestor SDB (X) of SDB (C), where ancestor SDB (X) is a node, which is related to SDB (C), arranged above SDB (C) and contains a spear entry (step 1252). If the size of ancestor SDB (X) is determined to be greater than T/2 (in step 1254), light SDB (C) is not merged with ancestor SDB (X) and the MergeUp operation ends.

On the other hand, if the size of SDB (X) is less than T/2 (in step 1254), the method determines (in step 1255) whether or not a support SDB (S) can be found for light SDB (X). As shown in FIG. 12C, the "CheckSupportDown" operation may begin (in step 1270) by searching for a support SDB (S) in a level lower than ancestor SDB (X), such that the combined size of SDBs (S) and (X) is greater than or equal to T. The support SDB (S) must be different from light SDB (C). If a support SDB (S) is found in step 1272, the support sub-database is returned as SDB (D) in step 1276, otherwise SDB (D) is set equal to "null" in step 1274. Returning to FIG. 12B, SDB (C) may be merged up towards and combined with ancestor SDB (X) if a support sub-database was found (steps 1256 and 1258); otherwise, no merging is performed. Regardless of whether the additional merge is needed, the DSM algorithm ends after the longest matching prefix is found and recorded (in step 1260) for all spear entries that were affected by the addition of prefix (p) to SDB (A). Thus, in the worst-case scenario, the incremental add DSM algorithm requires no more than one split operation and one merge operation to accommodate added prefix (p).

The incremental delete DSM update algorithm 1300 is illustrated in FIG. 13A. DSM algorithm 1300 may begin (in step 1310) by deleting a prefix (p) from a sub-database (A) to form an updated sub-database (B). Next, the method may find the closes ancestor SDB (X) of SDB (B), where ancestor SDB (X) contains a spear entry (step 1320). If the size of updated SDB (B) is greater than or equal to the minimum number (e.g., T/2) of prefix entries (in step 1330), and the combined size of SDBs (B) and (X) is greater than or equal to the maximum number (e.g., T) of prefix entries (in step 1340), the method may end after the longest matching prefix is found and recorded (in step 1390) for all spear entries that were affected by the deletion of prefix (p) from SDB (A). This is considered a "good update", since no further processing is required to incrementally delete prefix (p) from SDB (A).

However, if the combined size of SDBs (B) and (X) is less than T (in step 1340), the method determines (in step 1360) whether or not a support SDB (S) can be found for light SDB (X), as described in the "CheckSupportDown" operation of FIG. 12C. If a support sub-database is found (in steps 1360 and 1370), the method may end after the longest matching prefix is found and recorded (in step 1390) for all spear entries that were affected by the deletion of prefix (p) from SDB (A). This is also considered a "good update," since no further processing is required to incrementally delete prefix (p) from SDB (A). A process for performing a "bad update" is described in more detail below.

Figure 13B:
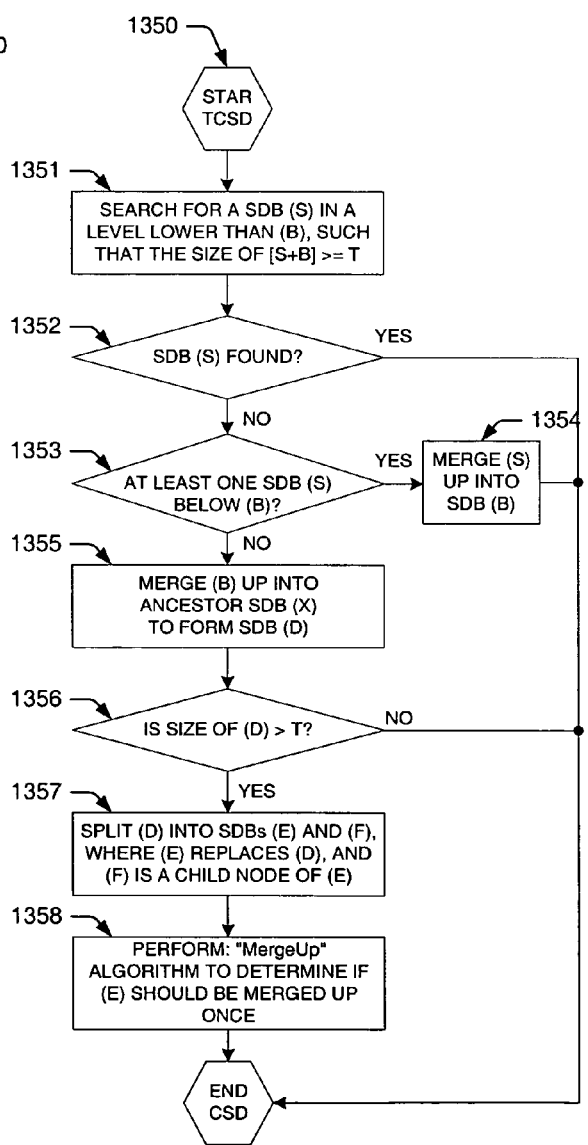
FIG. 13B is a flow-chart diagram illustrating an exemplary method for performing a modified "CheckSupportDown" operation on an underflowed sub-database.

If the size of SDB (B) is less than T/2 (in step 1330), the method determines (in step 1350) whether: (1) a support SDB (S) can be found in a level lower than SDB (B), such that the combined size of SDBs (B) and (S) is greater than or equal to T, or (2) at least one SDB (S) exists below SDB (B), such the combined size of SDBs (B) and (S) is less than T, or (3) no sub-databases exist below SDB (B). Reference will now be made to FIG. 13B to illustrate this modified version of the "CheckSupportDown" operation.

As shown in FIG. 13B, the modified CheckSupportDown operation may begin (in step 1351) by searching for a support SDB (S) in a level lower than SDB (B), such that the combined size of SDBs (S) and (B) is greater than or equal to T. If condition (1) is satisfied, a support SDB (S) is found (in step 1352) and the method ends after the longest matching prefix is found and recorded (in step 1390) for all spear entries that were affected by the deletion of prefix (p) from SDB (A). If condition (2) is satisfied, at least one SDB (S) is found below SDB (B) in step 1353, SDB (S) is merged with SDB (B) in step 1354, and the method ends after the longest matching prefix is found and recorded (in step 1390) for all spear entries that were affected by the deletion of prefix (p) from SDB (A).

If neither condition (1) nor (2) is satisfied, SDB (B) is merged up towards and combined with ancestor SDB (X) to form SDB (D) in step 1355. If the size of newly merged SDB (D) is less than or equal to T, the method ends after the longest matching prefix is found and recorded (in step 1390) for all spear entries that were affected by the deletion of prefix (p) from SDB (A). However, if the size of newly merged SDB (D) is greater than T, SDB (D) will be split into a pair of nodes labeled, for instance, E and F (in step 1357). Node E may replace SDB (B), while node F becomes a child of node E. Next, the method determines (in step 1358) whether SDB (E)

should be merged up towards and combined with the next closest ancestor of SDB (E) that contains a spear entry. The next closest ancestor may be labeled, e.g., ancestor SDB (W). Such determination can be accomplished by performing the MergeUp operation of FIG. 12B, while substituting the appropriate variables. Regardless of whether the additional merge is needed, the DSM algorithm ends after the longest matching prefix is found and recorded (in step 1390) for all spear entries that were affected by the deletion of prefix (p) from SDB (A). Thus, in the worst-case scenario, the incremental delete DSM algorithm requires no more than one split-merge operation and one additional merge operation to delete prefix (p) from SDB (A).

Binary tree 1400 of FIG. 14 shows results that may be obtained using the same update list with incremental add DSM algorithm 1200 and incremental delete DSM algorithm 1300. Though the operations within the update list will be considered one-by-one to illustrate the results obtained after each incremental update, one of ordinary skill in the art would recognize how the add and delete DSM algorithms, and the results of those algorithms, may change if the update list were processed as a batch of updates. For example, if a batch of updates contains more than one add operation, the DSM algorithm may require up to one split-merge operation (as opposed to one split operation) plus one additional merge operation to accommodate the batch of updates.

Assume, for example, that prefix entry (11001101*) is the first to be deleted from the forwarding database, followed by the deletion of prefix entry (1100010*), the deletion of prefix entry (110000*), the addition of prefix entry (01110*), and so on. In other words, assume that the longest matching prefix entries are processed first, which would be the case if the update list were processed as a batch of updates. Though incremental update operations are typically performed in the order they are received, and thus, not restricted to operating on longer matching prefixes first, the incremental update operations will be described herein as if they were received in such order.

As shown in FIG. 14, the first three update operations invoke the incremental delete DSM algorithm of FIG. 13A, whereas the last three update operations invoke the incremental add DSM algorithm of FIG. 12A. During the first two update operations, prefix entries (11001101*) and (1100010*) are deleted from SDB (I), thereby reducing the size of SDB (I) from its original size of 27 to 26 and 25, respectively. However, the next closest ancestor containing a spear entry is root node R. Since the SDB at root node R contains 25 prefix entries, and the combined size of SDBs (I) and (R) is greater than or equal to T, the deletions to SDB (I) do not require any further action. In other words, the first two update operations are "good updates".

During the third update operation, another prefix entry (110000*) is deleted from SDB (I). Since the size of SDB (I) is now less than T/2, the modified CheckSupportDown operation is invoked to determine the next coarse of action. For the sake of simplicity, we will assume that SDB (I) is a leaf node containing no other SDBs. With this assumption, SDB (I) will be merged up and combined with SDB (R), thereby increasing the size of SDB (R) from its original size of 25 to 49. In this manner, the method may end after only one merging process, since newly merged SDB (R) contains less than T number of prefixes.

During the fourth and fifth update operations, prefix entries (01110*) and (01101*) are added to SDB (D), thereby increasing the size of SDB (D) from its original size of 48 to 49 and 50, respectively. However, the next closest ancestor containing a spear entry is root node R. Since the SDB at root node R now contains 49 prefix entries, and the combined size of SDBs (D) and (R) would be greater than T, no further action is required after the prefix entries are added to SDB (D). In other words, the fourth and fifth update operations are "good updates."

During the sixth update operation, another prefix entry (01100*) is added to SDB (D). Since the latest addition causes SDB (D) to be greater than T, the prefix entries within SDB (D) are split among SDBs (T) and (U), where SDB (T) replaces SDB (D), and SDB (U) becomes a child node of SDB (T). Assume, for example, that SDB (T) contains 21 prefix entries and SDB (U) contains 30 prefixes. Since the size of SDB (T) is less than T/2 (i.e., 25 prefix entries), the MergeUp operation is invoked to determine whether SDB (T) should be merged up towards and combined with it's next closest ancestor. However, since the next closest ancestor containing a spear entry is root node R, and the size of the SDB (i.e., 49 prefix entries) at root node R is greater than T/2, no further merging is required and the method ends after only one splitting process.

Though the third and sixth update operations may be considered "bad updates," each operation performed only one merging process or one splitting process. As noted above, the incremental add DSM algorithms may require up to one splitting process and one merging process, whereas the incremental delete DSM algorithm may require up to one split-merge process and one additional merging process to complete a single update operation in the worst-case scenario. Additional worst case analysis of the DSM algorithms will be described in more detail below.

As noted above, the updates made to the software data structures in the control plane of the forwarding database may be downloaded to one or more hardware components in the data plane of the forwarding device. Exemplary methods for incrementally updating the hardware components, while maintaining coherency and atomicity, are described below in relation to the incremental add DSM algorithm. Similar methods may be performed (with or without modification) for maintaining coherency and atomicity during hardware component updates resulting from other update operations (e.g., the BISM, LISM, or incremental delete DSM algorithms).

To maintain coherency, the information within the on-chip data structure (e.g., the forwarding table in the NSE) must be consistent with the routing table information at all times. When coherency is maintained between the forwarding and routing tables, the forwarding table can be dynamically updated without disrupting on-going packet processing. As described below, coherency can be maintained even when duplicate spearees (i.e., duplicate copies of a prefix entry being updated) are temporarily stored in the hardware component being updated (e.g., NSE chip 50). In order to maintain atomicity, however, the hardware component should not be allowed to return inconsistent search results at any time.

The following steps, when performed in order, maintain coherency when a node (e.g., node B) is merged up towards and combined with another node (e.g., node C) in a higher level of the binary tree data structure to form updated SDB (D). The first step is to copy the prefix entry(s) corresponding to updated SDB (D) to the hardware component. The second step is to change C's information to point to updated SDB (D). In other words, the second step modifies the spear entry in the pointer table, which originally pointed to node C, to now point to updated SDB (D). Though the hardware component may temporarily store duplicate copies of the prefix entries, incoming packets will be processed with the updated information as soon as the appropriate spear entries are updated in the pointer table.

For a merging operation similar to the above, but where node D is different from node C, the following steps should be followed to maintain coherency. The first step is to copy the prefix entry(s) corresponding to updated SDB (D) to the hardware component. The second step is to add a new spear entry (SE), which points to the updated SDB (D), to the set of spear entries in the pointer table. If node D is arranged at a lower level than node C, a third step would delete the spear entries of any nodes (e.g., hypothetical node B) arranged below node C. The spear entries may be deleted from the set of spear entries in any order. If node D is arranged at a higher level than node C, the spear entry corresponding to node C would also be deleted in the third step.

Now consider the incremental add DSM algorithm of FIG. 12. Assume that an update operation causes a split-merge operation and one additional merging operation to be performed. Since this is a combination of split-merging and merging up, it is worth examining how split-merging alone can be performed while maintaining coherency.

Suppose an incremental addition to SDB (A) causes SDB (A) to be split-merged into a pair of leaf nodes (e.g., nodes B and C), each having a respective spear entry. As a result of the split-merge operation, SDB (B) may replace SDB (A), and SDB (C) may become a child node of SDB (B). This change can be made incrementally to the hardware component by doing the following steps in order. The first step is to copy the prefix entry(s) of the newly created SDB (C) to the hardware component. The order that the prefixes are written to the SDB does not matter. The second step is to add a new spear entry corresponding to node C to the set of spear entries in the pointer table. The third step is to delete the prefix entries that are now part of node C from original node A. The process of deleting the duplicate prefix entries may be performed in any order, since packet processing is diverted to the updated information as soon as the new spear entry is added to the pointer table. In other words, each delete may be performed simply to 'empty out' the duplicate prefix entry (e.g., by filling it with zeroes). Though an optimization algorithm could be used to altogether skip the third step in hardware (since those prefixes are covered by a longer matching SE), one needs to be careful for subsequent updates to node C.

Instead of using one threshold (T), each of the update algorithms described above may utilize several thresholds to provide better worst-case update performance. This process is called "hysteresis", and may be used to decrease the number of times a sub-database (SDB) falls outside of the predetermined size boundaries to become an exception sub-database. An explanation of exemplary threshold values is provided in the table below.

| Threshold value for the number of spearees in a SDB | Comments |
| --- | --- |
| $T_{MAX}$ | Maximum size of an SDB; generally determined by the hardware limit and memory management issues. When an SDB goes beyond $T_{MAX}$, it needs to be speared again. |
| $T_H$ | Maximum value of the size of an SDB immediately after spearing has been performed on it. |
| $T_L = \text{ceil}(T_H/2)$ | Used in the spearing process. |
| $T_{MIN}$ | Desired minimum value of the size of an SDB at all times. |

Referring to the above table, a "spearee" is the entity on which spearing is being performed—for example, prefixes in a SDB. In some cases, the term "spearing" may refer to an incremental update operation (e.g., an incremental add or delete) after which only splitting is performed, only merging is performed, a combination of splitting and merging is performed, or neither splitting nor merging is performed.

A worst-case analysis of the incremental add and delete DSM algorithms may now be described using the concept of hysteresis. It will be shown that the above algorithms maintain at all times a maximum number of spear entries, Ns, as a function of N spearees, such that:

$$N_s \leq \frac{N}{T_{min}} (\forall N \geq T_{min}) \qquad (1)$$

where the following relationship exists between the thresholds:

$$T_{MIN} < T_L = \left\lceil \frac{T_H}{2} \right\rceil < 2T_{MIN} < T_H < T_{MAX} \qquad (2)$$

As noted above, a "light" spear entry (SE) is defined as a SE that has strictly less than $T_{MIN}$ prefixes. A "support-SE" may then be defined as a SE (e.g., at SDB (A)) that has a light SE (e.g., at SDB (B)) as its immediate ancestor SE (i.e., node B is the parent of node A, and no other SEs exist between nodes A and B), such that $|A|+|B| \geq 2T_{MIN}$. In other words, it is said that "A supports B" if the combined size of SDBs (A) and (B) is greater than or equal to $2T_{MIN}$. Also noted above, a SE is said to "underflow" if it is light, and "overflow" if its size becomes strictly greater than $T_{MAX}$. With these definitions in mind, the following statements can be made about the incremental add and delete DSM update algorithms of FIGS. 12 and 13. Note: the following statements may also be considered when hysteresis is not used by the incremental add and delete DSM algorithms by substituting T for $T_{MAX}$ and $T_H$, and substituting ceil(T/2) for $T_{MIN}$ and $T_L$.

Statement 1: The DSM update algorithms maintain the invariant that, when the total number of prefix entries, N, is greater than $T_{MIN}$ ($\forall N \geq T_{MIN}$), every light SE will be supported by a unique support-SE. In other words, if there exists a light SE somewhere in the tree, there exists an immediate descendant of the light SE, which supports it. If this is true, then every pair of SEs will have at least $2T_{MIN}$ number of prefixes (i.e., a light+support SE pair has at least $2T_{MIN}$ prefixes) associated therewith. Hence, the upper bound on the maximum number of spear entries, Ns, is $N/T_{MIN}$ at all times.

Statement 2: Immediately after a bad add or a bad delete, if any spear entry is merged or newly created as a result of the bad update, then (1) the upper bound on the size of the spear entry will be $\leq T_H$, and either (2a) the lower bound on the size of the spear entry will be $\geq T_L$, OR (2b) the light spear entry will be supported by a unique support-SE, such that the combined size of the light SE and its support SE is $>T_H$. In other words, Statement 2 proves that if Statement 1 is true at any time t, it will continue to remain true even after bad updates (e.g., bad adds or bad deletes) force an existing spear entry to be merged or a new spear entry to be created.

We can now analyze the amount of work done by the incremental add and delete DSM update algorithms in the worst-case scenario. For the purpose of this discussion, the worst-case scenario occurs when updates are performed one prefix at a time per SBD—i.e., one prefix is updated (either added, or deleted) to an SDB. Since an update of more than one prefix per SDB gets amortized per prefix, the amount of work done during a single update to a SDB divided by the number of updates to that SDB is maximized when the number of updates is 1.

With regard to the amount of work done to perform an update, it should be obvious by now that good updates are less costly than bad ones. For example, good deletes generally require a small fixed number of CPU cycles to empty out the deleted prefix. Likewise, good adds may require a small fixed number of CPU cycles, plus a few writes (at most) for processing each good add.

Though bad deletes and adds are costly in terms of the amount of work done, the DSM algorithms ensure that they happen rarely. In other words, we will show that over a period of several updates, the total amount of work done by the DSM algorithms is bounded. This is called "amortized analysis." Note that this is still a worst-case analysis (and not an average-case analysis), where the worst-case is analyzed over a sequence of updates.

To illustrate the concept of bounded work done, we will show that for every bad update, there must be several good updates. In other words, if a bad update is made to a SDB, a number of good updates must have occurred to that SDB in the past for that bad update to have happened at all.

Let us first consider the case of a bad add operation. As noted above in Statement 2, each spear entry (SE) immediately following a bad add operation will contain at most $T_H$ number of prefix entries. Since a bad add only occurs when the size of the SDB exceeds $T_{MAX}$, at least $[T_{MAX}-T_H]$ number of good adds must have occurred prior to the bad add operation. Hence, the amount of work done per bad add is amortized by a factor of $[T_{MAX}-T_H]$.

Next, consider the case of a bad delete operation. There are generally only two reasons why a bad delete may occur: (1) a non-light SE becomes light through successive deletions at the corresponding SDB (note: this may take at least $[T_L-T_{MIN}]$ number of deletes), or (2) the size of a light-SE/support-SE pair falls below $2T_{MIN}$ (which would cause the pair to be merged again). Since, the light-SE/support-SE pair contains at least $T_H$ number of prefixes immediately after a bad update is performed (as set forth in Statement 2), the bad delete operation may only occur after at least $[T_L-T_{MIN}]$ delete operations have been performed on from one or both of the SEs in the pair.

Now, consider the case in which bad adds and deletes are intermixed. This is actually not different from the above cases, because of Statement 2, where we proved that the size of every spear entry recently affected by an update operation is bounded by a lower bound (i.e., $T_L$) and an upper bound (i.e., $T_H$).

In summary, the amortized work done during an add operation is:

$$W_{add} \leq \frac{(T_{MAX} - T_H) \times W_{good\_add} + W_{bad\_add}}{T_{MAX} - T_H + 1} \quad (3)$$

Likewise, the amortized work during a delete operation is:

$$W_{del} \leq \frac{(T_L - T_{MIN} + 1) \times W_{good\_del} + W_{bad\_del}}{T_L - T_{MIN} + 1} \quad (4)$$

Hence, the total amount of work done per update is the summation of the amount of work done to update the longest matching prefix for a SDB affected by the update operation and the higher of $W_{add}$ and $W_{del}$.

Note that because the forwarding database structure is hierarchical, a bad add made to the forwarding database may lead to bad spear entry (SE) updates in the pointer table. However, not all spear entry updates will be bad. For example, let us look carefully again at a bad add to an existing spear entry, A, that creates two new spear entries, B and C, where B is higher than C. In such a case, the following may apply:

(1) If B is not light, a new SE may be added to the pointer table, where the new SE could be bad.

(2) If B is light but its ancestor is either not light, or has some support, the same conditions may apply as stated above in condition (1).

(3) If B is merged up with its light ancestor, X, to form spear entry Y, two SE adds (i.e., Y and C) and two SE deletes (i.e., A and B) may be required to complete the update operation. In other words, the add and delete operations can be "matched up" so that there are no bad adds or deletes in pointer table. Even if there are temporarily more SEs in a sub-database than the $T_{MAX}$ value of that sub-database allows, the temporary duplication of SEs will have no adverse affects on packet processing, because there is a matching delete immediately following it.

We can also consider the case in which a bad delete of spear entry (SE), A, is made to the forwarding database. The following cases may occur:

(1) If A is merged up with another SE, e.g., B, the resulting deletion of SE A could be a bad delete.

(2) If A is merged up and then split-merged (as in the case of a bad add), a maximum of one bad delete may occur (since others may be matched up).

The above calculations for the amount of work done during an update operation show that: (1) a bad add at one level of the database causes, at most, one potentially bad add at a higher level of the database, or two good adds and two good deletes, and (2) a bad delete at one level of the database causes, at most, one potentially bad delete at a higher level of the database, plus two good adds and two good deletes.

Therefore, one benefit of the incremental add and delete DSM algorithms is that there is no need to do more than one split-merge at any one time under a single route update. This implies that the update performance of the DSM algorithm is bounded in the worst-case to touching no more than $2*T_{MAX}$ number of prefixes. In other words, the DSM algorithm demonstrates an improvement of $N/(2T_{MAX})$, or a factor of about 2000-5000, over the Static Split-Merge (SSM) algorithm for typical values of N and $T_{MAX}$ (e.g., N=1 million, Tmax=200). The DSM algorithm also demonstrates an improvement of W/2, or a factor of about 16-30, over the SSM algorithm for typical values of W (e.g., 32 for Ipv4, 60 for VPN etc.).

It should be appreciated that references throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure to aid in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method for updating a forwarding database that includes a total number N of prefixes, the method comprising:
   forming a hierarchical binary tree structure having root, branch and leaf nodes that define (i) at least a minimum number N/T of sub-databases of the forwarding database and (ii) respective bit combinations associated with the sub-databases, wherein each prefix of the N prefixes is stored within one of the sub-databases having an associated bit combination that matches corresponding bits within the prefix, and wherein each of the sub-databases has no more than a predetermined maximum number T of prefixes, and at least one of the sub-databases includes a plurality of the prefixes that are not stored in any of the other sub-databases;
   modifying the hierarchical tree structure in accordance with one or more update operations; and
   updating one or more of the sub-databases to reflect modifications made to the hierarchical tree structure, wherein the one or more updated sub-databases correspond to only those portions of the hierarchical tree affected by the update operations.

2. The method of claim 1, wherein said forming comprises, beginning with a most significant bit of the N number of prefixes, repeatedly splitting the N number of prefixes into a plurality of nodes extending between and including a root node and a plurality of leaf nodes, and wherein each of the leaf nodes corresponds to one of the sub-databases.

3. The method of claim 2, wherein said modifying comprises performing the update operations on one or more of the plurality of leaf nodes, wherein the update operations are selected from a group comprising: adding a new prefix to the forwarding database, deleting an existing prefix from the forwarding database and modifying an existing prefix in the forwarding database.

4. The method of claim 3, wherein said modifying further comprises performing the update operations on one or more of the branch nodes.

5. The method of claim 3, wherein said modifying further comprises:
   splitting, into at least one additional pair of leaf nodes, a leaf node associated with a sub-database to which a new prefix is to be added and which, upon adding the new prefix would contain more than T prefixes; and
   merging, with a branch node, a leaf node associated with a sub-database which, upon completion of an update operation, would be left with fewer than a predetermined number of prefixes.

6. The method of claim 5, wherein said merging is performed if either (i) a total number of sub-databases defined by the hierarchical tree structure would be, absent said merging, greater than a predetermined number, or (ii) a predetermined time period has passed, in which no merging was performed.

7. The method of claim 6, wherein said merging further comprises repeatedly merging the leaf node and the branch node up towards the root node if the total number of prefixes within the leaf node, the branch node and any subsequently merged branch nodes remains less than the minimum number of prefixes.

8. The method of claim 5, wherein said merging is performed only if no other node exists below the branch node that can be paired with the leaf node, such that the combined number of prefixes within the leaf node and the other node is greater than T.

9. The method of claim 8, wherein said merging is performed no more than one time in response to an update operation.

10. A computer-readable storage medium having recorded therein one or more sequences of instructions which, when executed by a processor, cause the processor to update a forwarding database having a total number N of prefixes, including causing the processor to:
   form a hierarchical binary tree structure having root, branch and leaf nodes that define (i) at least a minimum number N/T of sub-databases of the forwarding database and (ii) respective bit combinations associated with the sub-databases, wherein each prefix of the N prefixes is stored within one of sub-databases having an associated bit combination that matches corresponding bits within the prefix, and wherein each of the sub-databases has no more than a predetermined maximum number T of prefixes, and at least one of the sub-databases includes a plurality of the prefixes that are not stored in any of the other sub-databases;
   modify the hierarchical tree structure in accordance with one or more update operations; and
   update one or more of the sub-databases to reflect modifications made to the hierarchical tree structure, wherein the one or more updated sub-databases correspond to only those portions of the hierarchical tree affected by the update operations.

11. The computer readable storage medium of claim 10, wherein the computer readable storage medium is directly coupled to, or incorporated within, the processor, and wherein at least a portion of the sub-databases are contained within the computer readable storage medium.

12. The computer readable storage medium of claim 11, wherein the computer readable storage medium comprises random access memory.

13. The computer readable storage medium of claim 11, wherein the computer-readable storage medium comprises one or more of a random access memory, a content-addressable memory, or a network search engine (NSE).

* * * * *